(12) United States Patent
Kawamura et al.

(10) Patent No.: US 11,546,456 B2
(45) Date of Patent: Jan. 3, 2023

(54) HANDS-FREE DEVICE, HANDS-FREE SYSTEM, AND DATA TRANSFER METHOD

(71) Applicant: Panasonic Intellectual Property Management Co., Ltd., Osaka (JP)

(72) Inventors: Satoshi Kawamura, Kanagawa Ken (JP); Tomoaki Katada, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 40 days.

(21) Appl. No.: 17/215,441

(22) Filed: Mar. 29, 2021

(65) Prior Publication Data

US 2021/0306449 A1    Sep. 30, 2021

(30) Foreign Application Priority Data

Mar. 30, 2020 (JP) .............................. JP2020-061433
Mar. 31, 2020 (JP) .............................. JP2020-064906

(51) Int. Cl.
*H04B 7/00* (2006.01)
*H04M 1/60* (2006.01)
(Continued)

(52) U.S. Cl.
CPC ............ *H04M 1/6091* (2013.01); *B60K 35/00* (2013.01); *H04M 1/2746* (2020.01);
(Continued)

(58) Field of Classification Search
CPC ............. H04M 1/6091; H04M 1/2746; H04M 3/42059; H04W 4/48; H04W 4/80; B60K 35/00; B60K 2370/577; B60K 2370/563
(Continued)

(56) References Cited

U.S. PATENT DOCUMENTS

2010/0144401 A1* 6/2010 Azuma ............. H04M 1/72469
455/569.2
2015/0223064 A1* 8/2015 Takemura ............. H04W 12/06
455/411
(Continued)

FOREIGN PATENT DOCUMENTS

JP    2002-193046    7/2002
JP    2006-109292    4/2006
(Continued)

*Primary Examiner* — April G Gonzales
(74) *Attorney, Agent, or Firm* — Greenblum & Bernstein, P.L.C.

(57) ABSTRACT

A hands-free device enables a hands-free call by being wirelessly connected to a mobile phone. The hands-free device incudes a hardware processor configured to: perform a control related to data transfer using a transfer protocol for implementing transfer of history data including incoming call history data and outgoing call history data, and phone book data stored in the mobile phone when the mobile phone is in a wireless connection area; receive the history data and the phone book data from the mobile phone through communication using the transfer protocol; and store the history data and the phone book data that are received. The hardware processor is configured to perform the control to transfer the history data prior to the phone book data.

12 Claims, 23 Drawing Sheets

(51) Int. Cl.
      *H04M 1/2757*    (2020.01)
      *H04M 1/2746*    (2020.01)
      *B60K 35/00*      (2006.01)
      *H04W 4/48*      (2018.01)
      *H04M 3/42*      (2006.01)
      *H04W 4/80*      (2018.01)

(52) U.S. Cl.
      CPC ..... *H04M 1/2757* (2020.01); *H04M 3/42059* (2013.01); *H04W 4/48* (2018.02); *H04W 4/80* (2018.02); *B60K 2370/563* (2019.05); *B60K 2370/577* (2019.05); *B60K 2370/5911* (2019.05); *H04M 2250/02* (2013.01)

(58) Field of Classification Search
      USPC ...................................................... 455/569.2
      See application file for complete search history.

(56) References Cited

U.S. PATENT DOCUMENTS

| | | | |
|---|---|---|---|
| 2016/0014273 A1* | 1/2016 | Joh | G10L 15/28 455/563 |
| 2021/0306449 A1* | 9/2021 | Kawamura | H04M 1/6091 |
| 2022/0196647 A1* | 6/2022 | Aburaya | G01N 33/54393 |

FOREIGN PATENT DOCUMENTS

| | | |
|---|---|---|
| JP | 2014-116958 | 6/2014 |
| JP | 2021-032843 | 3/2021 |
| JP | 2021-135226 | 9/2021 |
| WO | 2014/050459 | 4/2014 |

\* cited by examiner

FIG.7A

| OUTGOING CALL HISTORY DATA | | |
|---|---|---|
| TARO ABE | 090×××××××× | AUGUST 10 12:15 |
| HANAKO SATO | 090×××××××× | AUGUST 10 12:00 |
| TARO ABE | 090×××××××× | AUGUST 10 11:20 |
| KAZUO TANAKA | 090×××××××× | AUGUST 10 11:10 |
| KAZUO TANAKA | 090×××××××× | AUGUST 10 10:50 |
| JIRO NOMURA | 090×××××××× | AUGUST 10 10:15 |

FIG.7B

| PHONE BOOK DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| ... | 090×××××××× |

FIG.7C

| OUTGOING CALL HISTORY DATA | | |
|---|---|---|
| ICHIRO KATO | 090×××××××× | AUGUST 10 13:40 |
| TARO ABE | 090×××××××× | AUGUST 10 12:15 |
| HANAKO SATO | 090×××××××× | AUGUST 10 12:00 |
| TARO ABE | 090×××××××× | AUGUST 10 11:20 |
| KAZUO TANAKA | 090×××××××× | AUGUST 10 11:10 |
| KAZUO TANAKA | 090×××××××× | AUGUST 10 10:50 |

← REGISTRATION NAMES IN PHONE BOOK DATA ARE DISPLAYED

FIG.8A

| INCOMING CALL HISTORY DATA | | |
|---|---|---|
| ICHIRO KATO | 090××××××× | AUGUST 10 13:00 |
| AIKO HAYASHI | 090××××××× | AUGUST 10 12:25 |
| ROKURO MORI | 090××××××× | AUGUST 10 11:45 |
| ICHIRO KATO | 090××××××× | AUGUST 10 11:15 |
| SHICHIRO YAMADA | 090××××××× | AUGUST 10 11:10 |
| HACHIRO UEDA | 090××××××× | AUGUST 10 10:20 |

FIG.8B

| PHONE BOOK DATA | |
|---|---|
| ICHIRO KATO | 090××××××× |
| GORO OKADA | 090××××××× |
| SHIRO MORI | 090××××××× |
| JIRO YAMADA | 090××××××× |
| ICHIRO YOSHIMOTO | 090××××××× |
| SABURO WATANABE | 090××××××× |
| … | 090××××××× |

FIG.8C

| INCOMING CALL HISTORY DATA | | |
|---|---|---|
| ICHIRO YOSHIMOTO | 090××××××× | AUGUST 10 13:25 |
| ICHIRO KATO | 090××××××× | AUGUST 10 13:00 |
| AIKO HAYASHI | 090××××××× | AUGUST 10 12:25 |
| ROKURO MORI | 090××××××× | AUGUST 10 11:45 |
| ICHIRO KATO | 090××××××× | AUGUST 10 11:15 |
| SHICHIRO YAMADA | 090××××××× | AUGUST 10 11:10 |

← REGISTRATION NAMES IN PHONE BOOK DATA ARE DISPLAYED

FIG.9A

| MISSED CALL HISTORY DATA | | |
|---|---|---|
| TARO MURAKAMI | 090×××××××× | AUGUST 10 12:28 |
| HANAKO SAITO | 090×××××××× | AUGUST 10 12:24 |
| HANAKO UEDA | 090×××××××× | AUGUST 10 12:06 |
| JIRO OOBAYASHI | 090×××××××× | AUGUST 10 11:04 |
| HANAKO SAITO | 090×××××××× | AUGUST 10 10:54 |
| KAZUO OOMURA | 090×××××××× | AUGUST 10 10:24 |

FIG.9B

| PHONE BOOK DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| … | 090×××××××× |

FIG.9C

| MISSED CALL HISTORY DATA | | |
|---|---|---|
| SABURO WATANABE | 090×××××××× | AUGUST 10 12:46 |
| TARO MURAKAMI | 090×××××××× | AUGUST 10 12:28 |
| HANAKO SAITO | 090×××××××× | AUGUST 10 12:24 |
| HANAKO UEDA | 090×××××××× | AUGUST 10 12:06 |
| JIRO OOBAYASHI | 090×××××××× | AUGUST 10 11:04 |
| HANAKO SAITO | 090×××××××× | AUGUST 10 10:54 |

← REGISTRATION NAMES IN PHONE BOOK DATA ARE DISPLAYED

FIG.10

| OUTGOING CALL HISTORY DATA | | |
|---|---|---|
| TARO ABE | 090xxxxxxxx | AUGUST 10 12:15 |
| HANAKO SATO | 090xxxxxxxx | AUGUST 10 12:00 |
| TARO ABE | 090xxxxxxxx | AUGUST 10 11:20 |
| KAZUO TANAKA | 090xxxxxxxx | AUGUST 10 11:10 |
| KAZUO TANAKA | 090xxxxxxxx | AUGUST 10 10:50 |
| JIRO NOMURA | 090xxxxxxxx | AUGUST 10 10:15 |

| INCOMING CALL HISTORY DATA | | |
|---|---|---|
| ICHIRO KATO | 090xxxxxxxx | AUGUST 10 13:00 |
| AIKO HAYASHI | 090xxxxxxxx | AUGUST 10 12:25 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |
| HACHIRO UEDA | 090xxxxxxxx | AUGUST 10 10:20 |

| MISSED CALL HISTORY DATA | | |
|---|---|---|
| TARO MURAKAMI | 090xxxxxxxx | AUGUST 10 12:28 |
| HANAKO SAITO | 090xxxxxxxx | AUGUST 10 12:24 |
| HANAKO UEDA | 090xxxxxxxx | AUGUST 10 12:06 |
| JIRO OOBAYASHI | 090xxxxxxxx | AUGUST 10 11:04 |
| HANAKO SAITO | 090xxxxxxxx | AUGUST 10 10:54 |
| KAZUO OOMURA | 090xxxxxxxx | AUGUST 10 10:24 |

| ALL HISTORY DATA | | |
|---|---|---|
| ICHIRO KATO | 090xxxxxxxx | AUGUST 10 13:00 |
| TARO MURAKAMI | 090xxxxxxxx | AUGUST 10 12:28 |
| AIKO HAYASHI | 090xxxxxxxx | AUGUST 10 12:25 |
| HANAKO SAITO | 090xxxxxxxx | AUGUST 10 12:24 |
| TARO ABE | 090xxxxxxxx | AUGUST 10 12:15 |
| HANAKO UEDA | 090xxxxxxxx | AUGUST 10 12:06 |
| HANAKO SATO | 090xxxxxxxx | AUGUST 10 12:00 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |

OUTGOING CALL HISTORY DATA WITH DUPLICATE PHONE NUMBERS IS NOT DISPLAYED

FIG.13A

| OUTGOING CALL PHONE NUMBER | OUTGOING CALL DATE AND TIME |
|---|---|
| 09000000005 | MAY 10 17:25 |
| 09000000004 | MAY 10 17:14 |
| 09000000003 | MAY 10 17:12 |
| 09000000002 | MAY 10 17:08 |
| 09000000001 | MAY 10 17:01 |

} OUTGOING CALL HISTORY DATA AUTOMATICALLY TRANSFERRED FROM MOBILE PHONE

FIG.13B

| OUTGOING CALL PHONE NUMBER | OUTGOING CALL DATE AND TIME |
|---|---|
| 09000000100 | MAY 10 17:32 |
| 09000000005 | MAY 10 17:25 |
| 09000000004 | MAY 10 17:14 |
| 09000000003 | MAY 10 17:12 |
| 09000000002 | MAY 10 17:08 |

} OUTGOING CALL HISTORY DATA OF HANDS-FREE DEVICE

} OUTGOING CALL HISTORY DATA AUTOMATICALLY TRANSFERRED FROM MOBILE PHONE

FIG.14A

| INCOMING CALL PHONE NUMBER | INCOMING CALL DATE AND TIME |
|---|---|
| 09000000010 | MAY 10 17:45 |
| 09000000009 | MAY 10 17:20 |
| 09000000008 | MAY 10 16:59 |
| 09000000007 | MAY 10 16:52 |
| 09000000006 | MAY 10 16:50 |

} INCOMING CALL HISTORY DATA AUTOMATICALLY TRANSFERRED FROM MOBILE PHONE

FIG.14B

| INCOMING CALL PHONE NUMBER | INCOMING CALL DATE AND TIME |
|---|---|
| 09000000200 | MAY 10 17:50 |
| 09000000010 | MAY 10 17:45 |
| 09000000009 | MAY 10 17:20 |
| 09000000008 | MAY 10 16:59 |
| 09000000007 | MAY 10 16:52 |

} INCOMING CALL HISTORY DATA OF HANDS-FREE DEVICE

} INCOMING CALL HISTORY DATA AUTOMATICALLY TRANSFERRED FROM MOBILE PHONE

PRESS "HISTORY BUTTON"
PRESS "OUTGOING CALL HISTORY BUTTON"

PRESS "HISTORY BUTTON"
PRESS "INCOMING CALL HISTORY BUTTON"

PRESS "PHONE BOOK"

FIG.18

| PHONE NUMBER | REGISTRATION NAME |
|---|---|
| 09000000001 | KAZUO TANAKA |
| 09000000002 | TARO ITO |
| 09000000005 | TARO ABE |
| 09000000006 | SHIRO MORI |
| 09000000007 | GORO KODAMA |
| 09000000009 | HANAKO SAITO |
| ⋮ | ⋮ |

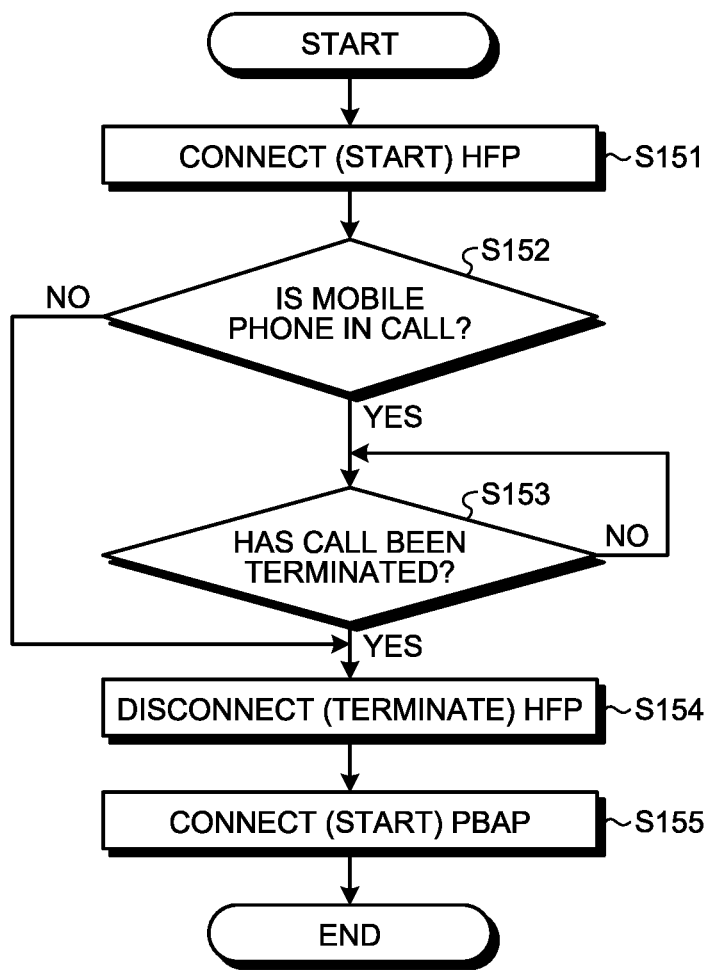

HANDS-FREE DEVICE, HANDS-FREE SYSTEM, AND DATA TRANSFER METHOD

CROSS-REFERENCE TO RELATED APPLICATIONS

This application is based upon and claims the benefit of priority from Japanese Patent Application No. 2020-061433, filed on Mar. 30, 2020, and Japanese Patent Application No. 2020-064906, filed on Mar. 31, 2020, the entire contents of which are incorporated herein by reference.

FIELD

The present disclosure relates to a hands-free device, a hands-free system, and a data transfer method.

BACKGROUND

Examples of a configuration in which a mobile phone automatically transfers phone book data indicating the correspondence between a phone number and a registration name, to an in-vehicle hands-free device, include a configuration in which when a user gets into a vehicle while carrying a mobile phone, and the mobile phone enters the range of short-range communication of the in-vehicle hands-free device, the mobile phone and the in-vehicle hands-free device establish a communication link, and the mobile phone automatically transfers phone book data to the in-vehicle hands-free device. With such a configuration, the user can select a desired phone number from the phone book data of the mobile phone and make an outgoing call by operating the in-vehicle hands-free device (see, for example, JP 2002-193046 A). In addition, techniques for improving user convenience in a system in which an in-vehicle device and a portable device are connected to each other, have been proposed (see, for example, WO 2014/050459 A and JP 2006-109292 A).

However, it is desired to further improve the convenience in relation to a hands-free device that enables hands-free calls.

An object of the present disclosure is to further improve the convenience of the hands-free device.

SUMMARY

A hands-free device according to the present disclosure enables a hands-free call by being wirelessly connected to a mobile phone that stores incoming call history data indicating an incoming call phone number as an incoming call source from which an incoming call has been received, outgoing call history data indicating an outgoing call phone number as an outgoing call destination to which an outgoing call has been made, and phone book data in which a phone number and a registration name corresponding to the phone number are registered. The hands-free device incudes a memory, and a hardware processor coupled to the memory. The hardware processor being configured to: perform a control related to data transfer using a transfer protocol for implementing transfer of history data including the incoming call history data and the outgoing call history data, and the phone book data stored in the mobile phone when the mobile phone is in a wireless connection area; receive the history data and the phone book data from the mobile phone through communication using the transfer protocol; and store the history data and the phone book data that are received. The hardware processor is configured to perform the control to transfer the history data prior to the phone book data.

BRIEF DESCRIPTION OF THE DRAWINGS

FIG. 7A is a diagram illustrating an example of display screen transition in a case where a user performs the outgoing call operation from an outgoing call history including emergency history data according to the first embodiment;

FIG. 7B is a diagram illustrating an example of display screen transition in the case where the user performs the outgoing call operation from an outgoing call history including emergency history data according to the first embodiment;

FIG. 7C is a diagram illustrating an example of display screen transition in the case where a user performs the outgoing call operation from an outgoing call history including emergency history data according to the first embodiment;

FIG. 8A is a diagram illustrating an example of a correspondence relationship between outgoing call history data and phone book data according to the first embodiment;

FIG. 8B is a diagram illustrating an example of the correspondence relationship between the outgoing call history data and the phone book data according to the first embodiment;

FIG. 8C is a diagram illustrating an example of the correspondence relationship between the outgoing call history data and the phone book data according to the first embodiment;

FIG. 9A is a diagram illustrating an example of a correspondence relationship between missed call history data and the phone book data according to the first embodiment;

FIG. 9B is a diagram illustrating an example of the correspondence relationship between the missed call history data and the phone book data according to the first embodiment;

FIG. 9C is a diagram illustrating an example of the correspondence relationship between the missed call history data and the phone book data according to the first embodiment;

FIG. 10 is a diagram illustrating an example of the outgoing call history data, incoming call history data, the missed call history data, and all history data according to the first embodiment;

FIG. 13A is a diagram illustrating an example of the outgoing call history data according to the first embodiment;

FIG. 13B is a diagram illustrating an example of the outgoing call history data according to the first embodiment;

FIG. 14A is a diagram illustrating an example of the incoming call history data according to the first embodiment;

FIG. 14B is a diagram illustrating an example of the incoming call history data according to the first embodiment;

FIG. 18 is a diagram illustrating an example of the phone book data according to the first embodiment;

FIG. 19 is a flowchart illustrating details of a flow of hands free profile (HFP) processing according to the first embodiment;

DETAILED DESCRIPTION

Hereinafter, embodiments of a hands-free device, a hands-free system, and a data transfer method according to the present disclosure will be described with reference to the drawings.

First Embodiment

Figure 1:
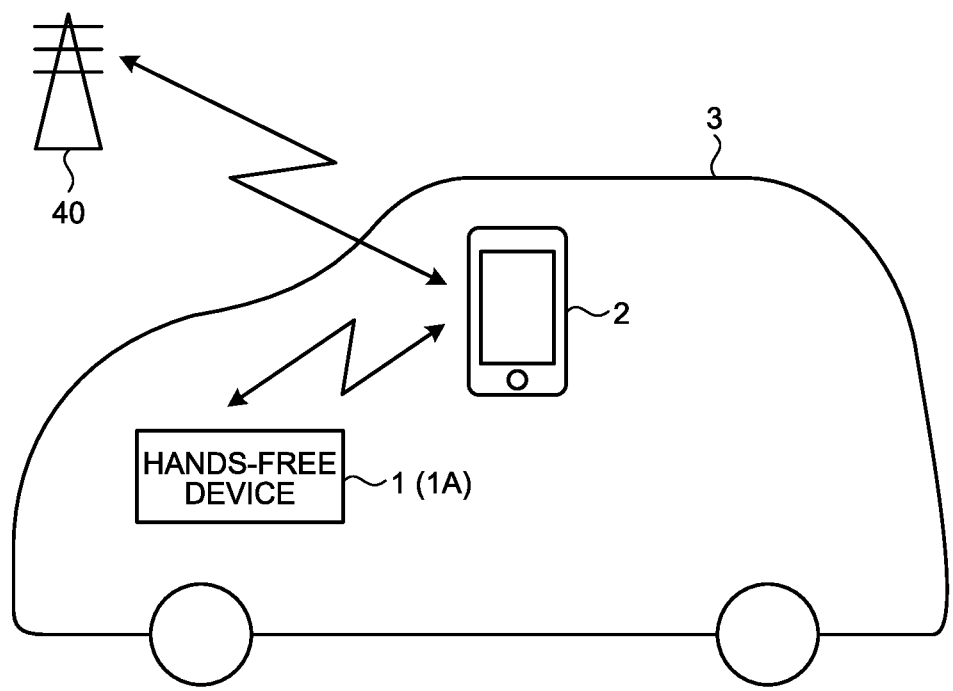
FIG. 1 is a diagram illustrating an example of a usage mode of an in-vehicle hands-free device according to a first embodiment.

FIG. 1 is a diagram illustrating an example of a usage mode of an in-vehicle hands-free device 1 according to the present embodiment. As illustrated in FIG. 1, the in-vehicle hands-free device 1 of the present embodiment can be mounted on a vehicle 3. The in-vehicle hands-free device 1 communicably connects to a mobile phone 2. Further, the mobile phone 2 performs wireless communication with a base station 40 via a mobile phone network. The mobile phone 2 is, for example, a smartphone, and has a communication function using Bluetooth (registered trademark), which is a short-range wireless communication unit. Note that the mobile phone 2 may also be a mobile phone of a type other than a smartphone as long as the mobile phone has a communication function using Bluetooth.

The in-vehicle hands-free device 1 connects to the mobile phone network via the mobile phone 2. This enables a driver of the vehicle 3, for example, to make and receive an incoming call by operating the in-vehicle hands-free device 1 without operating the mobile phone 2. The in-vehicle hands-free device 1 may be implemented as, for example, one function of an in-vehicle hands-free device mounted on the vehicle 3.

Figure 2:
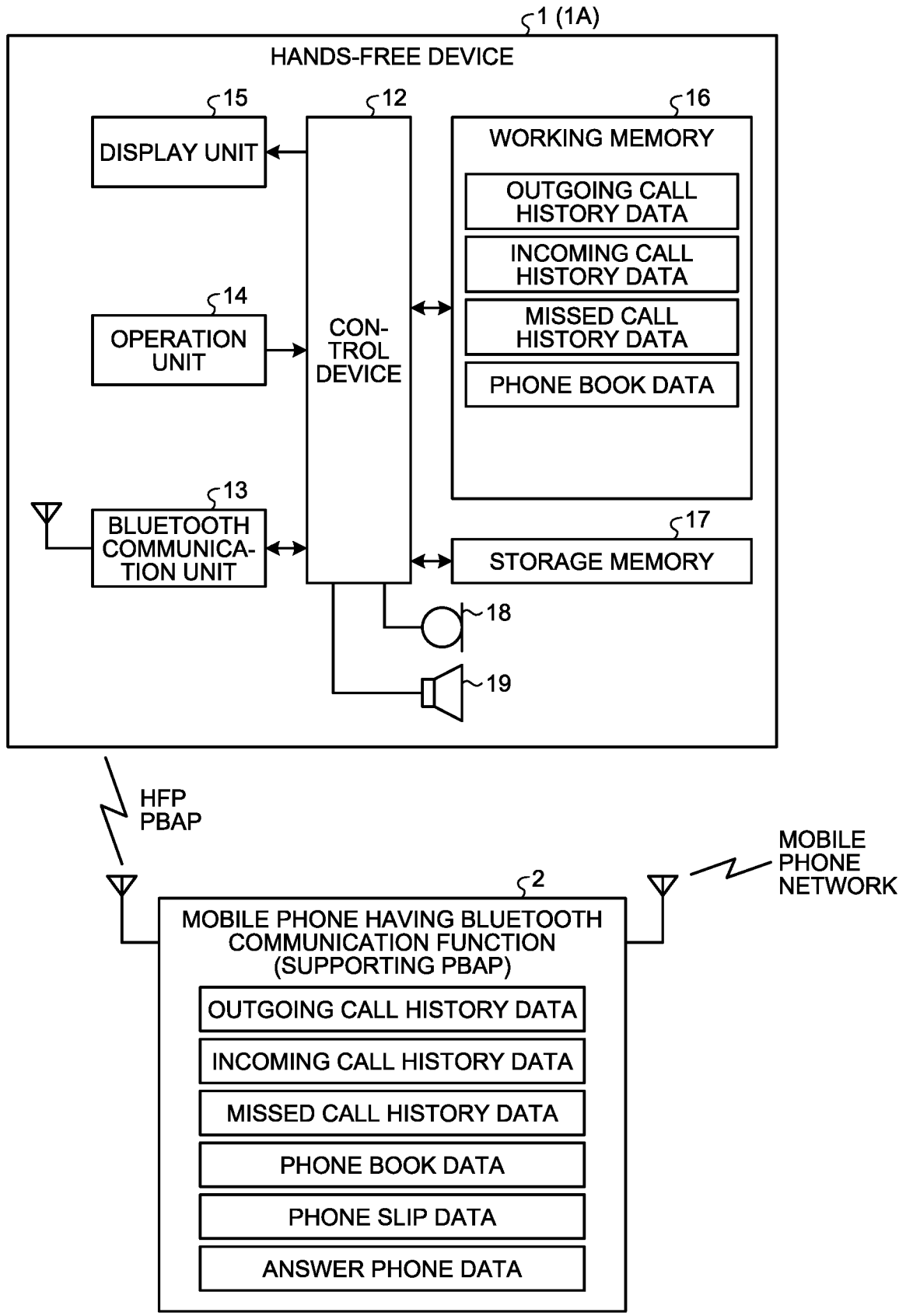
FIG. 2 is a diagram illustrating an example of a hardware configuration of the in-vehicle hands-free device according to the first embodiment.

FIG. 2 is a diagram illustrating an example of a hardware configuration of the in-vehicle hands-free device 1 according to the present embodiment. The in-vehicle hands-free device 1 of the present embodiment is, for example, an in-vehicle hands-free device having a hands-free function. The in-vehicle hands-free device 1 includes a control device 12, a Bluetooth communication unit 13, an operation unit 14, a display unit (display) 15, a working memory 16, a storage memory 17, a microphone 18, and a speaker 19.

The control device 12 controls all operations of the in-vehicle hands-free device 1, such as a communication operation and a data management operation. The control device 12 is, for example, a processor such as a central processing unit (CPU). The control device 12 is an example of a control unit, a determination unit, a display control unit, a transfer protocol control unit, a transfer protocol disconnection unit, a hands-free call protocol control unit, an initial hands-free protocol communication unit, a communication maintenance unit, a phone book transfer setting unit, a data transfer designation unit, and a manual transfer protocol instruction unit.

The Bluetooth communication unit 13 supports Bluetooth, which is a short-range wireless communication unit, and establishes a wireless communication link with the mobile phone 2 that is in a Bluetooth wireless communication range, to perform communication according to a Bluetooth communication protocol. Note that, in this case, it is assumed that the mobile phone 2 has a Bluetooth communication function and is in the Bluetooth wireless communication range of the in-vehicle hands-free device 1.

The Bluetooth communication unit 13 in this example supports a well-known hands free profile (HFP) for making a hands-free call, and a phone book access profile (PBAP) for transferring phone book data and outgoing/incoming call history data. These profiles mean communication protocols defined for respective functions. The Bluetooth communication unit 13 is an example of an outgoing call history data receiving unit, an incoming call history data receiving unit, a data receiving unit, a short-range wireless communication unit, a wireless communication unit, a hands-free call protocol connection unit, and a data transfer protocol connection unit.

As is well known, the mobile phone 2 is configured to be able to establish a mobile phone link with the base station 40 of the mobile phone network to perform outgoing call processing and incoming call processing independently (in a state where HFP connection with the in-vehicle hands-free device 1, which is a hands-free device, is not established). In this case, in the mobile phone 2, as the outgoing call processing, for example, the user can operate dial keys (numeric keys "0" to "9") (not illustrated) to input a phone number of an outgoing call destination, and then operate an outgoing call key (not illustrated) to make an outgoing call using the phone number as the outgoing call destination, thereby performing a call with a mobile phone as the outgoing call destination.

In addition, as the incoming call processing, when the mobile phone 2 receives an incoming call signal from the base station 40 in response to an outgoing call made from a mobile phone as an outgoing call source to the mobile phone 2 as the outgoing call destination, the mobile phone 2 receives from the base station 40, as an incoming call phone number, a phone number of the mobile phone as the outgoing call source, and when the user operates a call receiving key (not illustrated), it is possible to respond to the mobile phone as the outgoing call source, and perform a call with the mobile phone as the outgoing call source.

In addition, the mobile phone 2 includes a clock unit (not illustrated) that measures the date and time, and retains a plurality of pieces of outgoing call history data, in which a correspondence between an outgoing call phone number input from the dial keys in the outgoing call processing described above, and an outgoing call date and time based on the date and time measured by the clock unit is stored as one piece of data. In addition, the mobile phone 2 retains a plurality of pieces of incoming call history data, in which a correspondence between an incoming call phone number received from the base station 40 in the incoming call processing described above, and an incoming call date and time based on the date and time measured by the clock unit is stored as one piece of data.

In addition, the mobile phone 2 retains a plurality of pieces of missed call history data, in which a correspondence between an incoming call phone number received from the base station 40 when an incoming call is not accepted, and an incoming call date and time based on the date and time measured by the clock unit is stored as one piece of data. Further, the mobile phone 2 holds a plurality of pieces of phone book data, in which a correspondence between a phone number and a registration name as one piece of data. The phone book data includes a phone number and a registration name input by the user, and for example, about 500 pieces of phone book data in which phone numbers and registration names are associated with each other are stored in a non-volatile memory (not illustrated).

In a case where the mobile phone 2 holds the phone book data, the outgoing call history data and the incoming call history data include the registration name. Specifically, it is checked whether or not the incoming call phone number received from the base station 40 is a phone number registered in the phone book data, and whether or not a registration name for the phone number is registered in the phone book data, and in a case where the registration name exists in the phone book data, the incoming call history data is made to include the phone number, the incoming call date and time, and the registration name. With a similar processing, the missed call history data also includes the phone number, the incoming call date and time, and a corresponding registration name. Also regarding the outgoing call history data, it is checked whether or not the phone number to which the outgoing call is made in the outgoing call processing described above is a phone number registered in the phone book data, and in a case where the phone number exists in the phone book data, the outgoing call history data is made to include the outgoing call date and time, the outgoing call phone number, and a corresponding registration name.

Then, the user can properly make an outgoing call through a simple operation without having to enter all the numeric keys corresponding to numbers constituting the phone number one by one, by reading out the phone book data and selecting one phone number to make the outgoing call. Note that the mobile phone 2 can store the latest 20 pieces of each of the outgoing call history data, the incoming call history data, and the missed call history data, and automatically erases the oldest data each time the outgoing call processing, the incoming call processing, or the missed call processing is performed, to update the outgoing call history data, the incoming call history data, or the missed call history data. Further, the mobile phone 2 supports the well-known HFP for performing a hands-free call and the PBAP for transferring the phone book data and transferring the outgoing/incoming call history data.

In a case where the mobile phone 2 supports the PBAP that specifies an automatic transfer of the outgoing/incoming call history data, the PBAP connection is established immediately after the communication link with the Bluetooth communication unit 13 is established, to automatically transfer the phone book data stored at this point in time, and further automatically transfer the outgoing call history data, the incoming call history data, and the missed call history data stored at this point in time. As a result, in a case where the in-vehicle hands-free device 1 is within the Bluetooth communication range, the mobile phone 2 automatically transfers, to the in-vehicle hands-free device 1, up to 20 pieces of outgoing call history data stored by performing the outgoing call processing independently in the past, up to 20 pieces of incoming call history data stored by performing the incoming call processing independently in the past, and up to 20 pieces of missed call history data stored by performing the missed call processing independently in the past.

In the present embodiment, the outgoing call history data, the incoming call history data, and the missed call history data may be collectively and simply referred to as history data. Here, the history data includes at least the outgoing call history data and the incoming call history data. The history data may be constituted by the outgoing call history data and the incoming call history data, or may be constituted by the outgoing call history data, the incoming call history data, and the missed call history data.

Further, the mobile phone 2 stores, in the non-volatile memory (not illustrated), a voice message left by a caller when the incoming call is not accepted. The voice message is also called, for example, a phone slip, and the user of the mobile phone 2 can play and listen to the voice message.

The operation unit 14 is an operation means to be operated by the user in the present embodiment, includes, for example, touch keys formed on the display unit 15, detects an operation performed by the user, and outputs an operation signal indicating the content of the operation to the control device 12. The display unit 15 is a display unit in the present embodiment, and when a display signal is input from the control device 12, the display unit 15 displays a display screen on the basis of the input display signal. For example, the display unit 15 displays, as a display screen through which the user inputs a phone number, a display screen on which dial keys corresponding to "0" to "9" are arranged.

The working memory 16 is an outgoing call history data storage unit, an incoming call history data storage unit, and a data storage unit in the present embodiment, and is implemented by a volatile memory. The working memory 16 stores the outgoing call history data, the incoming call history data, the missed call history data, and the phone book data that are automatically transferred from the mobile phone 2 without any operation performed by the user. In this case, the working memory 16 can store, for example, five pieces of each of the outgoing call history data, the incoming call history data, and the missed call history data. The working memory 16 is, for example, a random access memory (RAM).

The storage memory 17 is implemented by a non-volatile memory and stores various data. The storage memory 17 is, for example, a read only memory (ROM). Further, the storage memory 17 may be a writable storage medium such as a hard disk drive (HDD) or a flash memory.

In this case, when the user requests the display of the outgoing call history data through the operation unit 14, the control device 12 causes the display unit 15 to display the outgoing call history data stored in the working memory 16, when the user requests the display of the incoming call history data through the operation unit 14, the control device 12 causes the display unit 15 to display the incoming call history data stored in the working memory 16, and when the user requests the display of the phone book data through the operation unit 14, the control device 12 causes the display unit 15 to display the phone book data stored in the working memory 16. Further, in the in-vehicle hands-free device 1 of the present embodiment, as described above, the numbers of pieces of outgoing call history data and pieces of incoming call history data stored in the working memory 16 are each five, and the maximum number of pieces of outgoing call history data and pieces of incoming call history data displayed on the display unit 15 are each also five. Note that the number of these pieces of data stored in the working memory 16 is an example, and is not limited to the above example.

The microphone 18 is a voice input unit for inputting a voice, and when a hands-free call is performed using the mobile phone 2, the voice uttered by the user is input through the microphone 18. The speaker 19 is a voice output unit, and when a hands-free call is performed using the mobile phone 2, the speaker 19 outputs the received voice of a calling partner. That is, when a Bluetooth communication link is established between the Bluetooth communication unit 13 and the mobile phone 2 to connect wireless communication using the HFP, the control device 12 transmits the voice input through the microphone 18 from the Bluetooth communication unit 13 to the mobile phone 2, and then from the mobile phone 2 to the mobile phone network, and the control device 12 causes the Bluetooth communication unit 13 to receive, from the mobile phone 2, the voice received by the mobile phone 2 from the mobile phone network and causes the speaker 19 to output the voice.

The above-described in-vehicle hands-free device 1 may further include functional blocks necessary for a navigation operation, such as a global positioning system (GPS) device as a current position detection unit that detects the current position of an own vehicle, a route search unit that searches for a route from the current position to a destination, a map data reading unit that reads map data from a recording medium on which map data is recorded, a vehicle information and communication system (VICS) information receiving unit that receives VICS information distributed from a VICS (registered trademark) center, and a voice recognition unit that recognizes a voice uttered by the user, in addition to the illustrated functional blocks. In this case, the in-vehicle hands-free device 1 may extract GPS date and time information from a wireless GPS signal received by the GPS device from a GPS satellite to acquire the date and time, and use the acquired date and time as the outgoing call date and time or incoming call date and time.

The above-described in-vehicle hands-free device 1 is configured to be activated and stopped in conjunction with the on/off of an ACC switch (a switch for starting or stopping the supply of power to vehicle equipment). In the in-vehicle hands-free device 1, for example, when the ACC switch is switched from on to off in response to an operation performed by the user, the supply of power is stopped, and as a result, a device power supply is switched from on to off. In this case, various data stored in the storage memory 17 immediately therebefore is not erased (is retained), but the outgoing call history data, the incoming call history data, and the missed call history data, and the phone book data stored in the working memory 16 immediately therebefore are erased.

Figure 3:
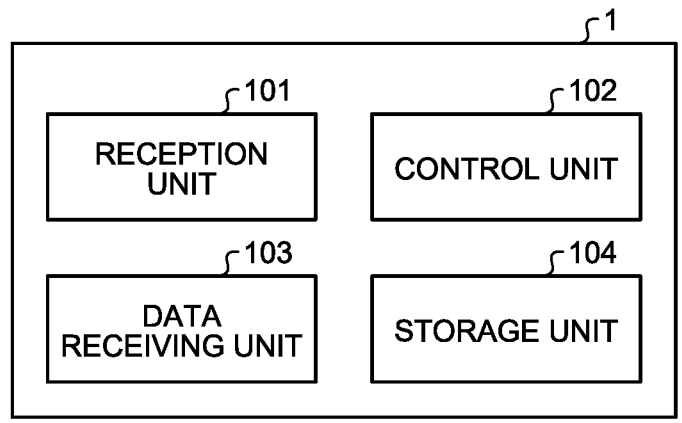
FIG. 3 is a diagram illustrating an example of functions of the in-vehicle hands-free device according to the first embodiment.

Next, the details of the functions of the in-vehicle hands-free device 1 of the present embodiment will be described. FIG. 3 is a diagram illustrating an example of the functions of the in-vehicle hands-free device 1 according to the present embodiment. Note that the functions of the in-vehicle hands-free device 1 are not limited to those in the example of FIG. 3, and the in-vehicle hands-free device 1 may further have other functions. In the example of FIG. 3, the in-vehicle hands-free device 1 of the present embodiment includes a reception unit 101, a control unit 102, a data receiving unit 103, and a storage unit 104.

In the present embodiment, the function of each of the reception unit 101, the control unit 102, and the data receiving unit 103 is implemented by the control device 12 reading a program from the storage memory 17 and executing the program. However, the present disclosure is not limited thereto, and for example, some or all of the functions of the reception unit 101, the control unit 102, and the data receiving unit 103 may be implemented by a dedicated hardware circuit. Further, the storage unit 104 is implemented by, for example, the storage memory 17.

The reception unit 101 receives various operations from the user. For example, the reception unit 101 receives an input corresponding to an operation performed by the user through the operation unit 14. More specifically, the reception unit 101 receives an instruction operation (for example, an operation of pressing an icon) for various images displayed on the display unit 15.

The control unit 102 performs various controls related to an in-vehicle hands-free function. In this example, the control unit 102 has a function of connecting to the mobile phone 2 so that a hands-free call can be performed, a function of performing a control related to data transfer using a transfer protocol for implementing the transfer of the incoming call history data, the outgoing call history data, and the phone book data stored in the mobile phone 2 when the mobile phone 2 is in a wireless connection area, and the like. Further, in this example, when a condition for making an emergency call is satisfied, the control unit 102 makes an outgoing call to an emergency call destination via the mobile phone 2, and in a case where the hands-free call protocol control unit is in a hands-free call protocol connection state and a call receiving state, when the call receiving state is terminated, and transition to a communication state different from the call receiving state occurs, the control unit 102 performs a control to receive the outgoing call history data from the mobile phone 2 by using a data transfer protocol (in this example, the PBAP) through the data transfer protocol connection unit. The outgoing call history data received from the mobile phone 2 includes a phone number of the emergency call destination or identification information of the emergency call destination. In this example, in a case where the condition for making an emergency call is satisfied, the control unit 102 makes an outgoing call to an emergency call destination via the mobile phone 2, and thereafter, once the termination of the call to the emergency call destination is detected, the control unit 102 performs a control to transfer emergency history data indicating a history related to emergency calls from the mobile phone 2 to the in-vehicle hands-free device 1. After the outgoing call history data is received from the mobile phone 2, the control unit 102 causes the display unit 15 to display an outgoing call operation screen through which an outgoing call operation using the outgoing call history can be performed according to the operation performed by the user. Details of various functions of the control unit 102 will be described later.

Here, the emergency call may be, for example, a call used in a predetermined emergency call system constructed by a public institution such as a national government. Further, in this case, a phone number for the emergency call may be predetermined by, for example, a corresponding public institution. An eCall system constructed in Europe is an example of the emergency call system, in which the phone number for the emergency call is a predetermined European common number (for example, "112"). Alternatively, the emergency call may be a call used in a dedicated call system introduced by a company (for example, an automobile manufacturer or an insurance company). In this case, the emergency call may be designed to be used by a user such as a customer of the company, and the phone number for the emergency call may be predetermined by the company.

Figure 4:
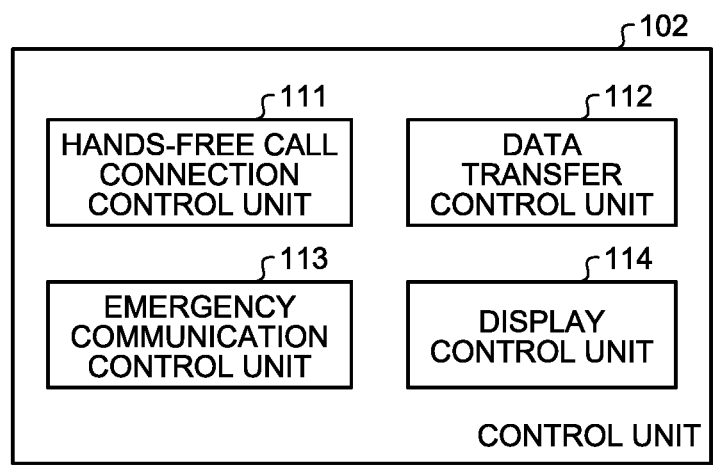
FIG. 4 is a diagram illustrating an example of detailed functions of a control unit of the in-vehicle hands-free device according to the first embodiment.

FIG. 4 is a diagram illustrating an example of detailed functions of the control unit 102. As illustrated in FIG. 4, the control unit 102 includes a hands-free call connection control unit 111, a data transfer control unit 112, an emergency communication control unit 113, and a display control unit 114. Note that the functions of the control unit 102 are not limited thereto, and the control unit 102 may further have other functions for implementing the in-vehicle hands-free function.

The hands-free call connection control unit 111 connects to the mobile phone 2 by using the HFP so that a hands-free call can be performed. More specifically, the hands-free call connection control unit 111 connects to the mobile phone 2 so that a hands-free call can be performed by controlling the Bluetooth communication unit 13. The hands-free call connection control unit 111 is an example of the "hands-free call protocol connection unit", and connects a hands-free call protocol for implementing a hands-free call performed by the mobile phone 2 between the in-vehicle hands-free device 1 and the mobile phone 2.

The data transfer control unit 112 controls data transfer using the transfer protocol (in this example, the PBAP). The emergency communication control unit 113 performs a control related to communication in the event of an emergency. The display control unit 114 performs a control to display various screens on the display unit 15. For example, the display control unit 114 performs a control to display the outgoing call operation screen or the like on the display unit 15. The specific contents thereof will be described later.

Note that although various functions of the in-vehicle hands-free device 1 are implemented by one device in the present embodiment, the present disclosure is not limited thereto, and for example, various functions of the in-vehicle hands-free device 1 may be distributed to a plurality of devices. That is, various functions of the in-vehicle hands-free device 1 may be implemented by a system (in-vehicle hands-free system) constituted by a plurality of devices.

Next, the operation of the above-described configuration will be described. In the present embodiment, the description is provided under the assumption that the mobile phone 2 already holds (stores) 20 pieces of outgoing call history data, 20 pieces of incoming call history data, and 20 pieces of missed call history data, 20 each being the maximum number of pieces of storable outgoing call history data, pieces of storable incoming call history data, and pieces of storable missed call history data, and in this state, the user carrying the mobile phone 2 approaches and gets into the vehicle 3, and the ACC switch is turned on, such that the mobile phone 2 enters the Bluetooth communication range of the in-vehicle hands-free device 1.

First, a procedure in which the control device 12 receives the outgoing call history data, the incoming call history data, the missed call history data, and the phone book data from the mobile phone 2 in the in-vehicle hands-free device 1 will be described with reference to FIG. 5. Further, the user pre-registers the mobile phone 2 as a partner of Bluetooth communication in the in-vehicle hands-free device 1.

For example, the user inputs a four-digit passcode for each mobile phone 2 to the in-vehicle hands-free device 1 at the time of initial communication setting. The in-vehicle hands-free device 1 and the mobile phone 2 generate a link key used for connection to each other and hold the link key. Then, the in-vehicle hands-free device 1 selects a mobile phone 2 with which communication connection is to be established by authenticating the link key at the time of initial connection. That is, communication connection using the HFP or communication connection using the PBAP is not established between the in-vehicle hands-free device 1 and an unregistered mobile phone. Basically, the mobile phone 2 of the owner of the vehicle 3 is pre-registered, and Bluetooth communication is performed between the mobile phone 2 and the in-vehicle hands-free device 1. Note that the above-described method for the pre-registration of the mobile phone 2 to be communicated with the in-vehicle hands-free device 1 is an example, and the present disclosure is not limited thereto.

In this example, it is assumed that a plurality of mobile phones 2 that may become communication targets are registered in the in-vehicle hands-free device 1. Further, for example, the user operates the operation unit 14 to preset priorities of the plurality of mobile phones 2, and the working memory 16 or the storage memory 17 stores the priorities. For example, since some drivers may own a plurality of mobile phones 2, it is possible to register the plurality of mobile phones 2 in the in-vehicle hands-free device 1 in this way.

In this example, it is assumed that the Bluetooth communication unit 13 of the in-vehicle hands-free device 1 supports both protocols of wireless communication using the HFP and wireless communication using the PBAP, and simultaneous connection of these two profiles (multi-profile connection) can be made. However, such simultaneous connection processing is not performed on purpose. There are the following three main reasons therefor.

(1) There is a possibility that the mobile phone 2 that is the communication partner supports wireless communication using the HFP and wireless communication using PBAP like the in-vehicle hands-free device 1, but does not support simultaneous connection.

(2) The mobile phone 2 that is the communication partner may support wireless communication using the HFP and wireless communication using PBAP, and support simultaneous connection as well, but even in this case, in order to maintain simultaneous connection, software processing performed by the Bluetooth communication unit 13 of the in-vehicle hands-free device 1 becomes complicated, and thus, there is a worry in the stability of the communication connection.

(3) The mobile phones 2 are manufactured by many manufacturers in the world, and thus, the in-vehicle hands-free device 1 is required to be connected to all mobile phones that support wireless communication using the HFP and wireless communication using the PBAP.

For the above reasons, as a more reliable processing procedure for wireless communication using the HFP and wireless communication using the PBAP, the in-vehicle hands-free device 1 in this example performs a serial connection, in which wireless communication using the HFP and wireless communication using the PBAP are temporally divided, in order to prevent simultaneous connection of wireless communication using the HFP and wireless communication using the PBAP as much as possible.

Returning to the description, the control unit 102 (hands-free call connection control unit 111) selects a mobile phone 2 having the highest priority as a communication target in wireless communication using the HFP (S1). Here, in this example, initial communication using the HFP is automatically attempted and connection is started without first performing communication connection using the PBAP.

Next, the control unit 102 (hands-free call connection control unit 111) performs processing of automatically connecting the initial communication using the HFP with the selected mobile phone 2 (S2). Further, the control unit 102 (hands-free call connection control unit 111) determines whether or not the wireless communication connection using the HFP is successful (S3).

In a case where it is determined that the wireless communication connection using the HFP is successful (S3 "YES"), the control unit 102 (hands-free call connection control unit 111) automatically disconnects the connected wireless communication using the HFP (S4).

Next, the control unit 102 (data transfer control unit 112) automatically connects wireless communication using the PBAP with the mobile phone 2 with which the wireless communication using the HFP is successfully connected (S5).

Next, the control unit 102 (data transfer control unit 112) transmits a history data transfer request to start processing of transferring the history data (in this example, the outgoing call history data, the incoming call history data, and the missed call history data) to the mobile phone 2 (S6).

The mobile phone 2 receiving the history data transfer request transfers the history data to the in-vehicle hands-free device 1 through Bluetooth communication using the PBAP. The control unit 102 (data transfer control unit 112) stores the history data transferred (downloaded) from the mobile phone 2 in the working memory 16 or the storage memory 17.

Once the processing of transferring the history data is completed, the control unit 102 (data transfer control unit 112) transmits a phone book data transfer request to the mobile phone 2 to start processing of transferring the phone book data (S7).

The mobile phone 2 receiving the phone book data transfer request transfers the phone book data to the in-vehicle hands-free device 1 through Bluetooth communication using the PBAP. The control unit 102 (data transfer control unit 112) stores the phone book data transferred from the mobile phone 2 in the working memory 16 or the storage memory 17.

Once the transfer of the phone book data is completed, the control unit 102 (data transfer control unit 112) disconnects the wireless communication using the PBAP with the mobile phone 2 (S8).

Next, the control unit 102 (data transfer control unit 112) automatically connects the wireless communication using the HFP with the mobile phone 2 again (S9).

Then, once the wireless communication using the HFP with the mobile phone 2 is established, the control unit 102 (hands-free call connection control unit 111) proceeds to hands-free (HF) standby processing (S10). While the hands-free standby processing is performed, the in-vehicle hands-free device 1 is in a state where a call can be made or received via the mobile phone 2. The hands-free standby processing is continued until the power of the in-vehicle hands-free device 1 is cut off or the wireless communication using the HFP with the mobile phone 2 is released. The release of the wireless communication using the HFP with the mobile phone 2 means that a case where the user performs a release operation on the in-vehicle hands-free device 1 or the mobile phone 2, or a case where the mobile phone 2 gets out of the Bluetooth communication range of the in-vehicle hands-free device 1.

As described above, in the present embodiment, wireless communication is automatically switched serially in the order of HFP→PBAP→HFP. As a result, it is possible to reliably and stably perform communication processing for mobile phones that support wireless communication using the HFP and wireless communication using the PBAP and are manufactured by many manufacturers. Further, with such a method, it is possible to reduce the complexity of software processing in the in-vehicle hands-free device 1.

In the hands-free (HF) standby processing, in a case where the condition for making an emergency call is satisfied (S11 "YES"), the control unit 102 (emergency communication control unit 113) makes an emergency call via the mobile phone 2 (S12). Then, the control unit 102 (emergency communication control unit 113) transmits position information of the own vehicle and the like (S13). The condition for making an emergency call can be set arbitrarily, and may include, for example, detection of an impact exceeding a threshold, activation of an airbag, and detection of a vehicle rollover. Further, the condition may include, for example, reception of an instruction to make an emergency call. A method for receiving the instruction to make an emergency call is arbitrary, but, for example, the instruction to make an emergency call may be received when an operation is performed on a graphical user interface (GUI) (for example, an icon) for giving an instruction to make an outgoing call, the GUI being displayed on the display unit 15, when a phone number for the emergency call is directly input through the operation unit 14, or when a hardware button disposed in a vehicle compartment is pressed. Note that the hardware button may be disposed at an arbitrary place (for example, a wall such as a ceiling, a dashboard, or a steering wheel) in the vehicle compartment of the vehicle 3, or may be disposed on the display unit 15. Further, the hardware button may be integrated with the operation unit 14.

In this example, in a case where it is determined that the above-described condition for making an emergency call is satisfied, the control unit 102 (emergency communication control unit 113) makes an outgoing call to a phone number of an emergency call destination (for example, "112") via the mobile phone 2. Once connected to the emergency call destination, the control unit 102 (emergency communication control unit 113) automatically transmits, in addition to information on the vehicle 3 (for example, a vehicle model and color), time information, position information, or the like, and also connects a voice link, such that the driver can talk to an operator of the emergency call destination on the phone.

Then, once the termination of the call to the emergency call destination (termination of the conversation with the operator) is detected (S14 "YES"), the control unit 102 (emergency communication control unit 113) performs a control to transfer emergency history data at least including an outgoing call history of an emergency call and indicating a history related to emergency calls from the mobile phone 2 to the in-vehicle hands-free device 1 (S15). A method for detecting the termination of the call is arbitrary, but, for example, the termination of the call can be detected by detecting a change from the call receiving state or calling state to a communication state different from the call receiving state or calling state (for example, transition from the call receiving state to a standby state, transition from the calling state to the standby state, or transition from the call receiving state to the call receiving state and then to the standby state). Further, a timing for transferring the emergency history data can be set arbitrarily, and is not limited to the timing when the termination of the call is detected.

Note that, in this example, once the termination of the call to the emergency call destination (termination of the conversation with the operator) is detected, the control unit 102 (emergency communication control unit 113) automatically starts the transfer of the emergency history data, but the present disclosure is not limited thereto. For example, the transfer of the emergency history data may also be started when a transfer start instruction is received through an operation of a GUI or hardware button.

Figure 6A:
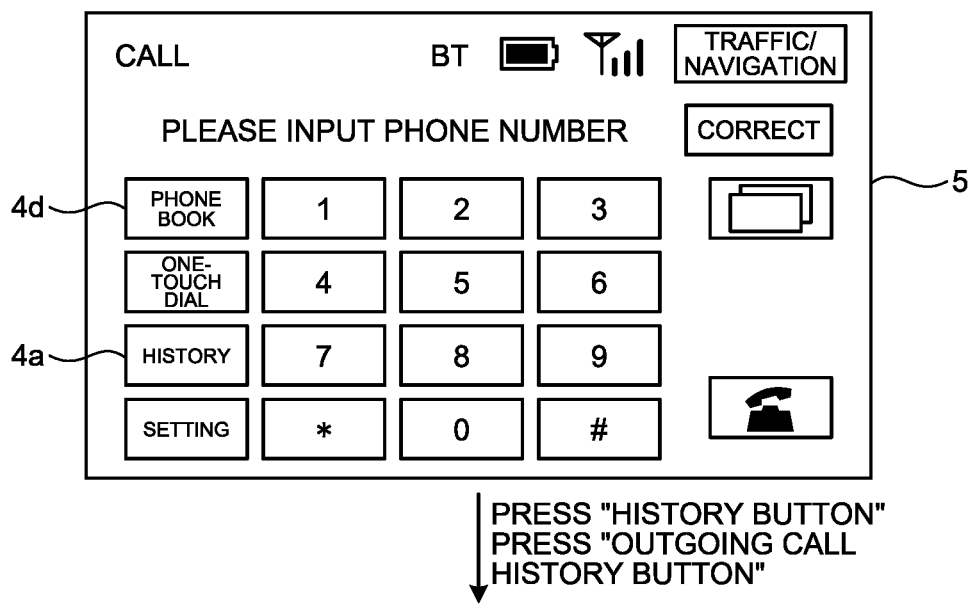
FIG. 6A is a diagram illustrating an example of screen transition in a case where an outgoing call operation screen through which an outgoing call operation using an outgoing call history of an emergency call can be performed is displayed according to the first embodiment.
Figure 6B:
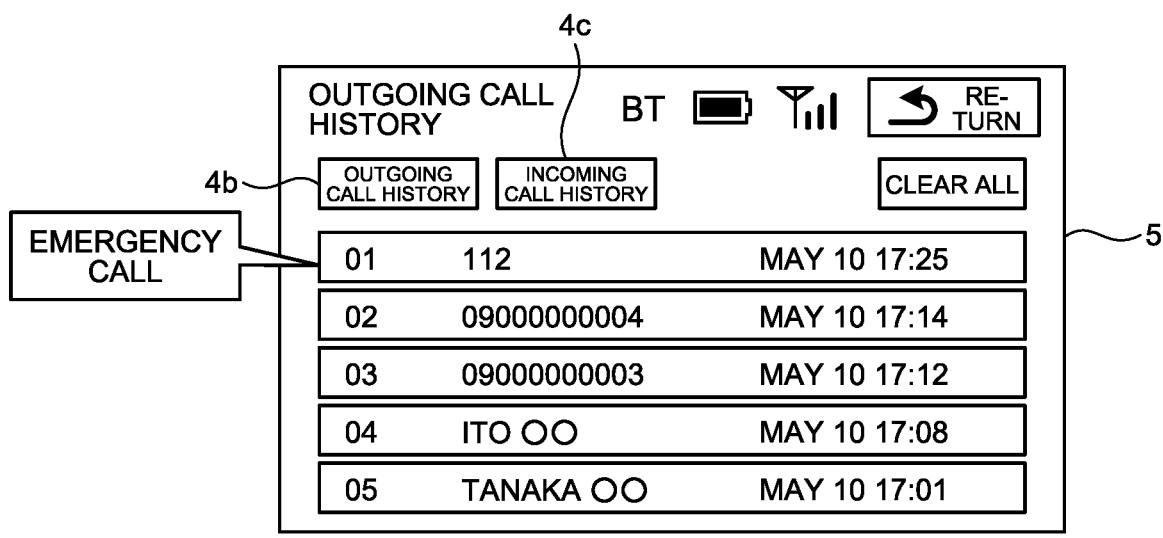
FIG. 6B is a diagram illustrating the example of the screen transition in the case where the outgoing call operation screen through which the call operation using the outgoing call history of the emergency call can be performed according to the first embodiment.

Further, in a case where the emergency history data is transferred from the mobile phone 2, the control unit 102 (emergency communication control unit 113) receives the outgoing call history data including a registration name, an outgoing call phone number, and an outgoing call date and time from the mobile phone 2 and stores the outgoing call history data in the working memory 16. Thereafter, when a request for displaying the outgoing call history data is received, the control unit 102 can display the outgoing call history data stored in the working memory 16 and perform outgoing call processing using the outgoing call history data. The outgoing call history data received from the mobile phone 2 includes a phone number of the emergency call destination or identification information of the emergency call destination. For example, when a "history" button is pressed on a screen of FIG. 6A, the control unit 102 (display control unit 114) performs a control to display a screen illustrated in FIG. 6B on the display unit 15. On the screen illustrated in FIG. 6B, the emergency call history (the number "112" illustrated in FIG. 6B is the number of the emergency call destination) is displayed. When the number of the emergency call destination is selected through the screen illustrated in FIG. 6B, the control unit 102 can perform outgoing call processing of making an outgoing call to the selected number as an outgoing call phone number. That is, the screen illustrated in FIG. 6B is an outgoing call operation screen through which an outgoing call operation using the emergency call history can be performed. The specific procedure of the outgoing call operation using the outgoing call history will be described later.

Note that, for example, a dedicated call operation screen (referred to as "emergency call operation screen") through which an outgoing call operation using only the emergency call history can be performed may be prepared separately from an outgoing call operation screen through which an outgoing call operation using a normal call history can be performed. In this case, for example, a dedicated operation unit (for example, a GUI or a hardware button) for calling the emergency call operation screen may be separately provided, and the control unit 102 may display the emergency call operation screen when the dedicated operation unit is operated.

Once the transfer of the above-described emergency history data is completed, the control unit 102 (hands-free call connection control unit 111) proceeds to the hands-free (HF) standby processing again.

Further, in a case where it is determined that the wireless communication connection using the HFP is not successful (has failed) (S3 "No"), the control unit 102 (hands-free call connection control unit 111) determines whether or not a mobile phone 2 having the next highest priority exists (S16).

In a case where it is determined that the mobile phone 2 having the next highest priority exists (S16 "Yes"), the control unit 102 (hands-free call connection control unit 111) selects the mobile phone 2 having the next highest priority as a wireless communication target (S17), returns to S2 described above, and repeats the above-described processing.

Further, in a case where it is determined that the mobile phone 2 having the next highest priority does not exist (S16

"No"), the control unit 102 (hands-free call connection control unit 111) ends the processing of the flowchart.

Next, the processing of transferring the outgoing call history data, the incoming call history data, and the missed call history data described above with reference to FIG. 5 and the like will be described in more detail.

FIGS. 7A to 7C are diagrams illustrating an example of the correspondence between the outgoing call history data and the phone book data according to the present embodiment. More specifically, FIG. 7A is an example of the outgoing call history data stored in the mobile phone 2. Further, FIG. 7B is an example of the phone book data stored in the mobile phone 2. Further, FIG. 7C is an example of the outgoing call history data stored or displayed in the in-vehicle hands-free device 1.

FIGS. 8A to 8C are diagrams illustrating an example of the correspondence between the incoming call history data and the phone book data according to the present embodiment. More specifically, FIG. 8A is an example of the incoming call history data stored in the mobile phone 2. Further, FIG. 8B is an example of the phone book data stored in the mobile phone 2. Further, FIG. 8C is an example of the incoming call history data stored or displayed in the in-vehicle hands-free device 1.

FIGS. 9A to 9C are diagrams illustrating an example of the correspondence between the missed call history data and the phone book data according to the present embodiment. More specifically, FIG. 9A is an example of the missed call history data stored in the mobile phone 2. Further, FIG. 9B is an example of the phone book data stored in the mobile phone 2. Further, FIG. 9C is an example of the missed call history data stored or displayed in the in-vehicle hands-free device 1.

The control unit 102 (data transfer control unit 112) receives the outgoing call history data including a registration name, an outgoing call phone number, and an outgoing call date and time illustrated in FIG. 7A from the mobile phone 2 and stores the outgoing call history data in the working memory 16 or the storage memory 17.

Further, the control unit 102 (data transfer control unit 112) receives the incoming call history data including a registration name, an incoming call phone number, and an incoming call date and time illustrated in FIG. 8A from the mobile phone 2 and stores the incoming call history data in the working memory 16 or the storage memory 17.

Further, the control unit 102 (data transfer control unit 112) receives the missed call history data including a registration name, a missed call phone number, and a missed call date and time illustrated in FIG. 9A from the mobile phone 2 and stores the missed call history data in the working memory 16 or the storage memory 17.

Further, in a case where the registration name is not included in the incoming call history data, the outgoing call history data, and the missed call history data in the mobile phone 2, the control unit 102 (data transfer control unit 112) may associate a phone number included in the incoming call history data, the outgoing call history data, or the missed call history data with a registration name associated with the phone number in the phone book data to add the registration name to the incoming call history data, the outgoing call history data, or the missed call history data, and store the added registration name in the working memory 16 or the storage memory 17. Then, when a request for displaying the outgoing call history data, the incoming call history data, or the missed call history data, the control unit 102 (display control unit 114) causes the display unit 15 to display the outgoing call history data, the incoming call history data, or the missed call history data stored in the working memory 16 or the storage memory 17. That is, the control unit 102 (display control unit 114) can cause the display unit 15 to display the registration name transferred from the mobile phone 2 without reading the registration name from the phone book data stored in the working memory 16 or the storage memory 17.

Note that the incoming call history data, the outgoing call history data, and the missed call history data may be stored in the working memory 16 or the storage memory 17 without including the registration name. In this case, the control unit 102 (display control unit 114) displays, on the display unit 15, a phone number included in the incoming call history data, the outgoing call history data, or the missed call history data, and a registration name associated with the phone number in the phone book data, in association with each other.

Figure 5:
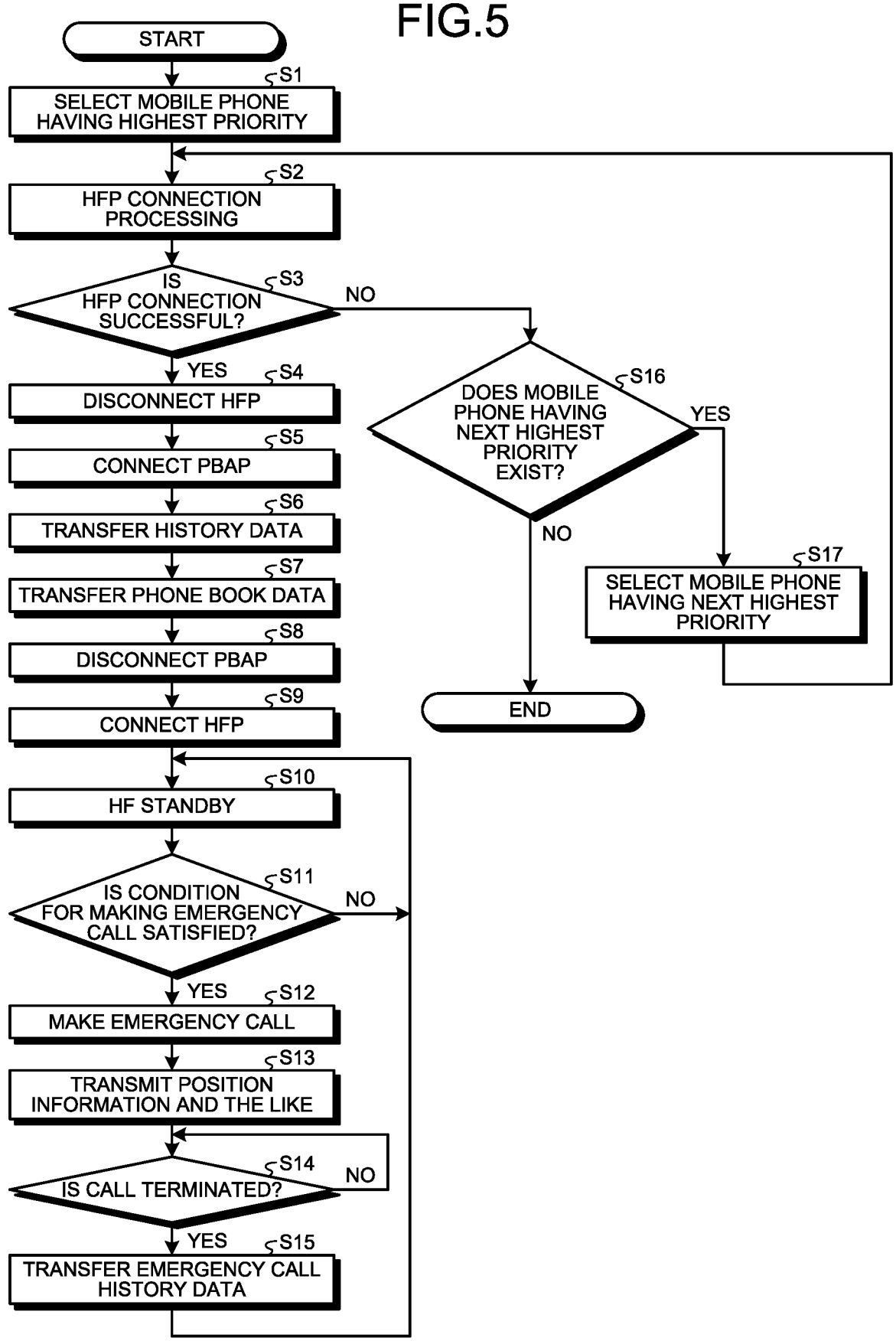
FIG. 5 is a diagram illustrating an example of a flow of data transfer processing according to the first embodiment.

Once the control unit 102 (hands-free call connection control unit 111) completes the HFP connection processing described in S25 of FIG. 5, the user can operate the operation unit 14 of the in-vehicle hands-free device 1 to perform the outgoing call processing and the incoming call processing.

Further, after the control unit 102 (data transfer control unit 112) receives the outgoing call history data, the incoming call history data, and the missed call history data from the mobile phone 2 through the processing for the initial connection with the mobile phone 2 described with reference to FIG. 5, new outgoing call processing, new incoming call processing, or new missed call processing may be performed in the in-vehicle hands-free device 1 or the mobile phone 2. Thereafter, in a case where the user operates the operation unit 14 to request the display of the outgoing call history data, the incoming call history data, or the missed call history data, the control unit 102 (display control unit 114) causes the display unit 15 to display a registration name corresponding to an outgoing call phone number, an incoming call phone number, or a missed call phone number subjected to new outgoing call processing, new incoming call processing, or new missed call processing as illustrated in FIGS. 7C, 8C, and 9C, in a case where the registration name exists in the phone book data transferred from the mobile phone 2.

More specifically, a case where the control unit 102 (hands-free call connection control unit 111) performs, as new outgoing call processing, outgoing call processing on a phone number of "Ichiro Kato". In this case, in a case where the registration name "Ichiro Kato" is registered in the phone book data, the control unit 102 (display control unit 114) reads the registration name "Ichiro Kato" from the phone book data and causes the display unit 15 to display the registration name as illustrated in FIG. 7C. In addition, as new incoming call processing, when there is a call from the phone number of "Ichiro Yoshimoto", in a case where the incoming call phone number is registered in the phone book data, the control unit 102 (display control unit 114) reads the registration name "Ichiro Yoshimoto" from the phone book data and causes the display unit 15 to display the registration name as illustrated in FIG. 8C. In addition, when there is a new missed call from the phone number of "Saburo Watanabe", the control unit 102 (display control unit 114) reads the registration name "Saburo Watanabe" from the phone book data and causes the display unit 15 to display the registration name as illustrated in FIG. 9C.

Further, when a request for displaying all history data (all call history) in which the outgoing call history data, the incoming call history data, and the missed call history data are collectively displayed from the latest to the oldest is received, in a case of the incoming call history data and the missed call history data, the control unit 102 (display control unit 114) selects a predetermined numbers of pieces of latest incoming call history data and pieces of latest missed call history data from all of the incoming call history data and missed call history data and displays the same, regardless of whether or not there are the same (duplicate) incoming call phone numbers or missed call phone numbers. Further, in a case of the outgoing call history data, the control unit 102 (display control unit 114) selects only the latest outgoing call history data among the outgoing call history data having the same (duplicate) outgoing call phone numbers.

FIG. 10 is a diagram illustrating an example of the outgoing call history data, the incoming call history data, the missed call history data, and the all history data according to the present embodiment. In the example illustrated in FIG. 10, the outgoing call phone number of "Taro Abe" is duplicated. In this case, the control unit 102 (display control unit 114) displays only the latest outgoing call history (outgoing call history data whose outgoing call date and time is August 10, 12:15) among the outgoing call histories of "Taro Abe", and do not display an outgoing call history that is not the latest outgoing call history.

Next, a procedure, in which the control device 12 receives the outgoing call history data, the incoming call history data, the missed call history data, and the phone book data from the mobile phone 2 and stores the same, and a procedure, in which an outgoing call is made by using the stored outgoing call history data, incoming call history data, and missed call history data, in the in-vehicle hands-free device 1 will be described. Although the outgoing call history data and the incoming call history data will be described here, the same applies to the missed call history data.

Figure 11:
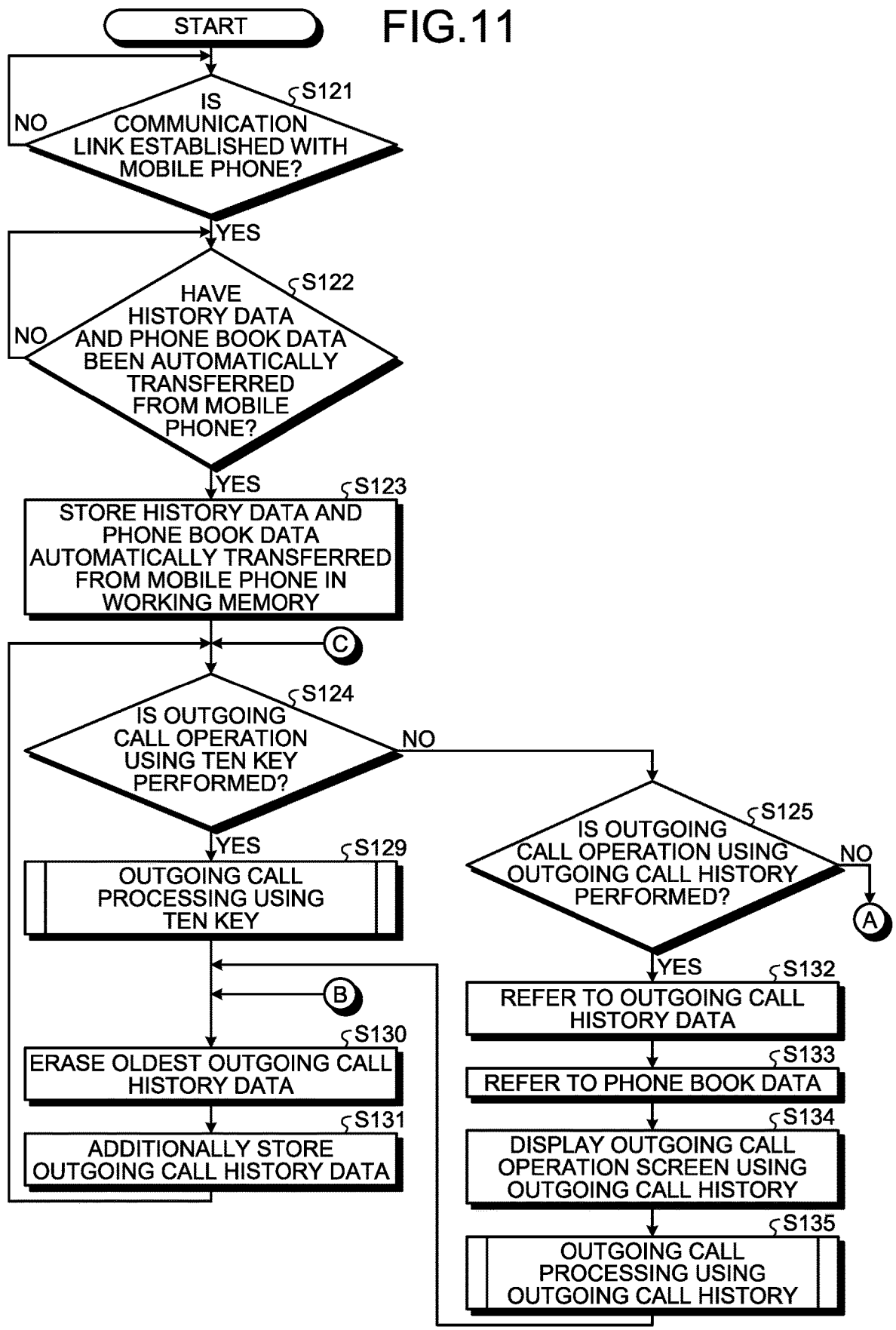
FIG. 11 is a diagram illustrating an example of a flow of processing of making an outgoing call by using the outgoing call history data, the incoming call history data, and the phone book data, the processing being performed by the in-vehicle hands-free device of the first embodiment.
Figure 12:
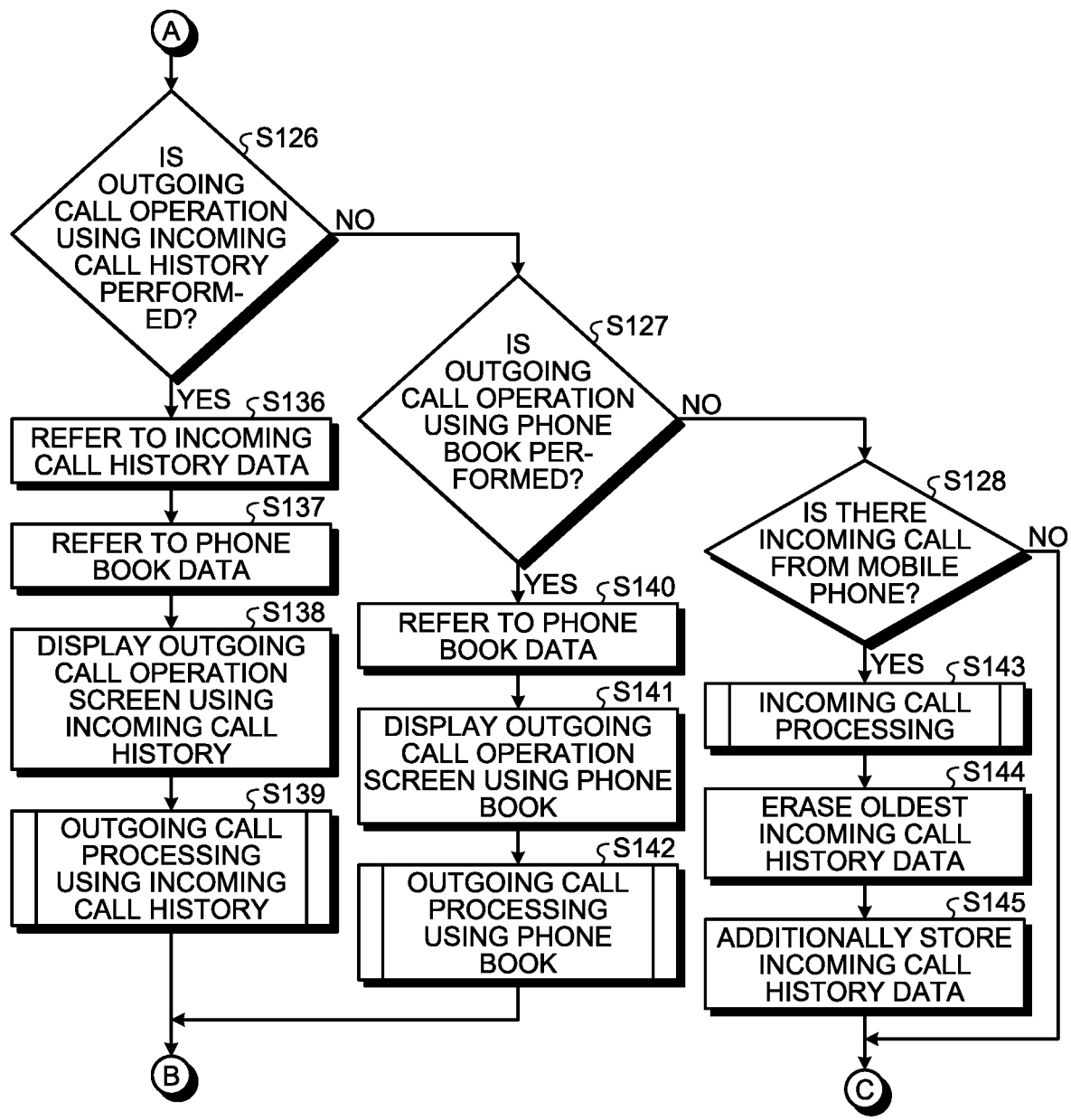
FIG. 12 is a diagram illustrating the example of the flow of the processing of making an outgoing call by using the outgoing call history data, the incoming call history data, and the phone book data, the processing being performed by the in-vehicle hands-free device of the first embodiment.

FIGS. 11 and 12 are diagrams illustrating an example of a flow of processing of making an outgoing call by using the outgoing call history data, the incoming call history data, and the phone book data, the processing being performed by the in-vehicle hands-free device 1 of the present embodiment. Note that the processing performed by the control device 12 in FIGS. 11 and 12 is, for example, the processing implemented by the control unit 102 or the like as described in FIG. 3.

Figure 15A:
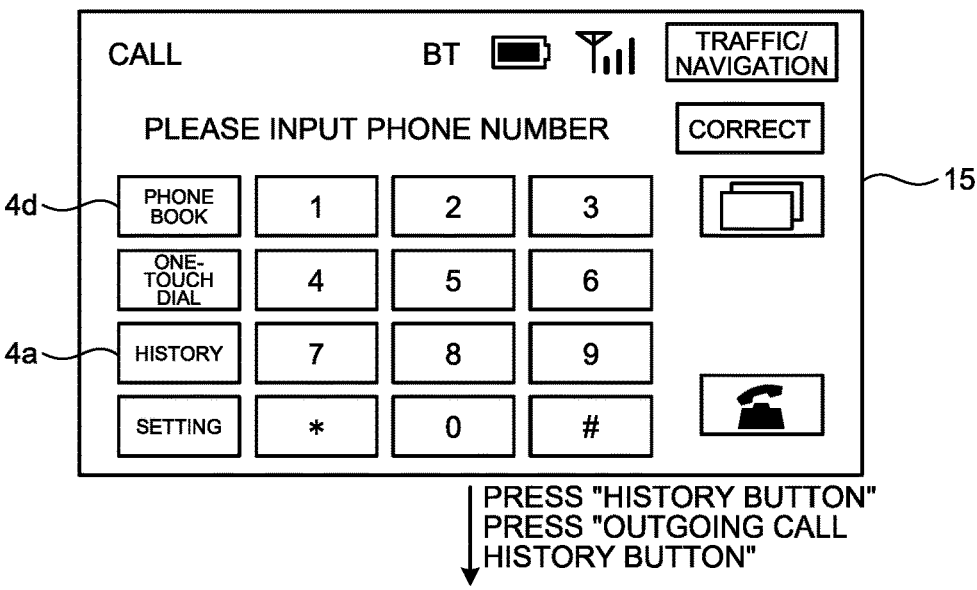
FIG. 15A is a diagram illustrating an example of display screen transition in a case where the user performs the outgoing call operation from the outgoing call history according to the first embodiment.
Figure 15B:
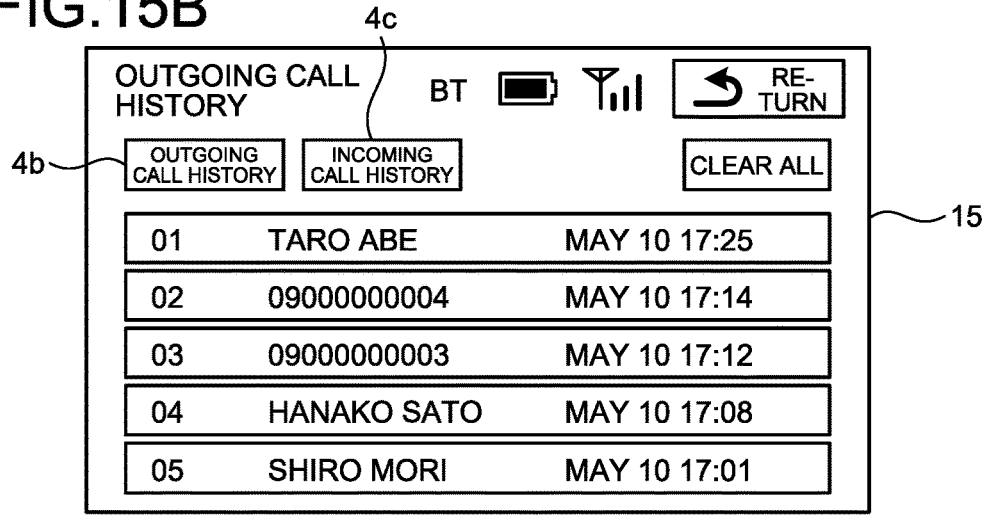
FIG. 15B is a diagram illustrating the example of the display screen transition in the case where the user performs the outgoing call operation from the outgoing call history according to the first embodiment.
Figure 15C:
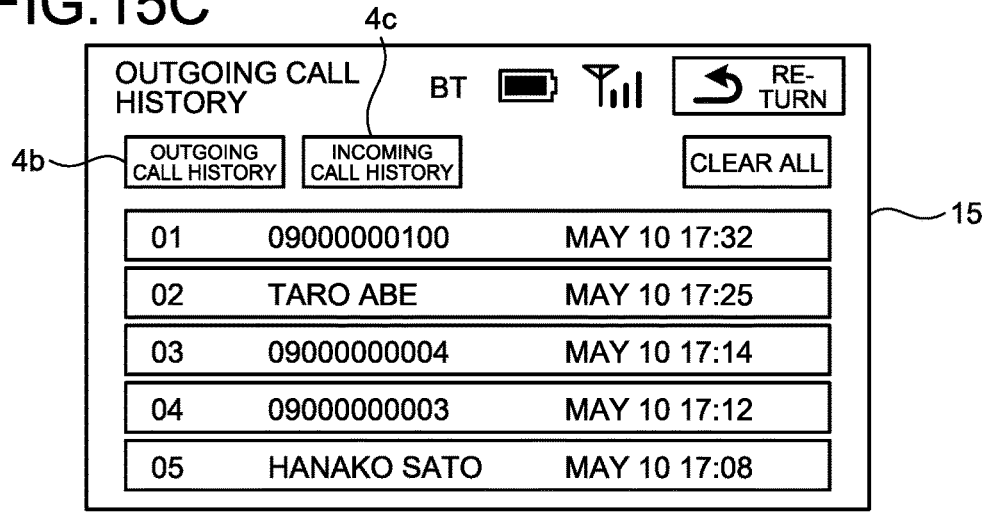
FIG. 15C is a diagram illustrating the example of the display screen transition in the case where the user performs the outgoing call operation from the outgoing call history according to the first embodiment.
Figure 16A:
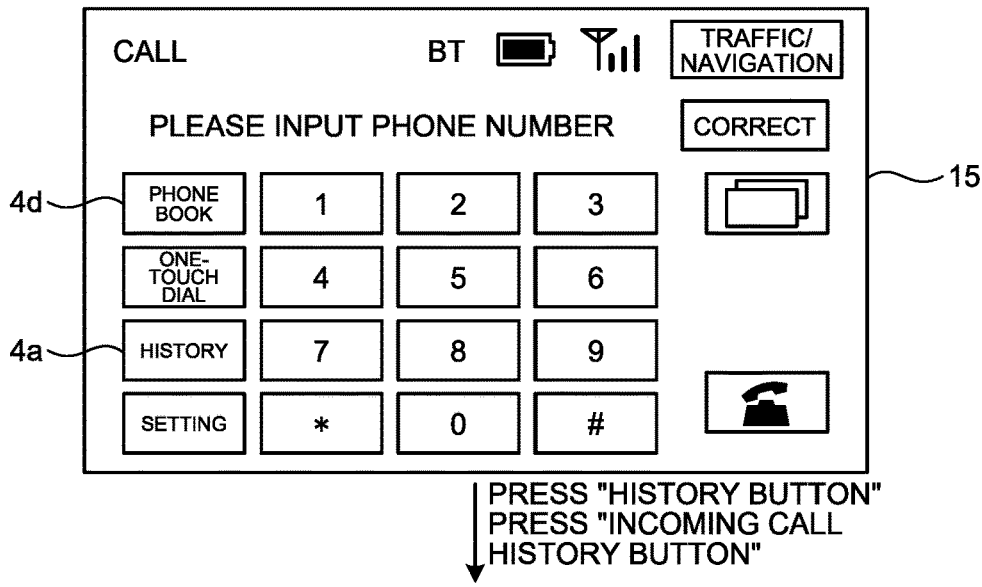
FIG. 16A is a diagram illustrating an example of display screen transition in a case where the user performs the outgoing call operation from an incoming call history according to the first embodiment.
Figure 16B:
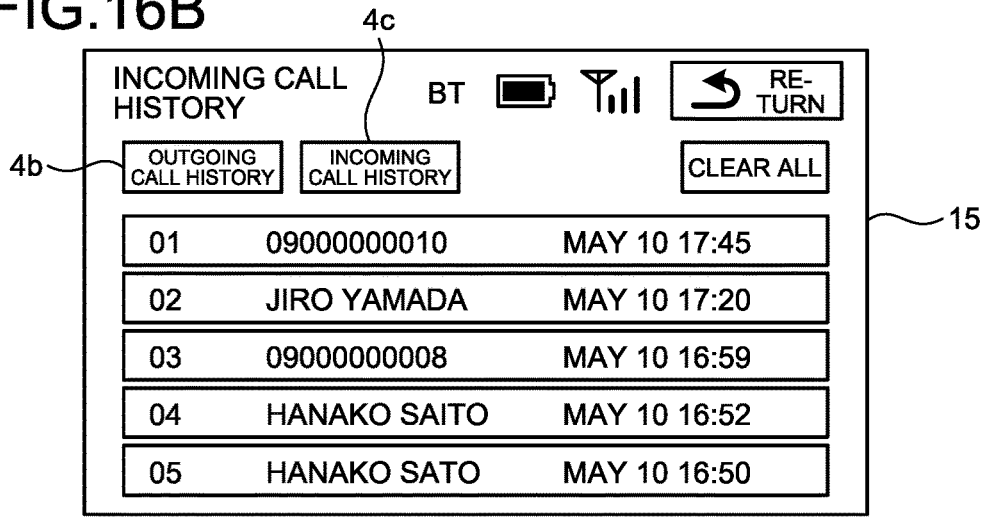
FIG. 16B is a diagram illustrating the example of the display screen transition in the case where the user performs the outgoing call operation from the incoming call history according to the first embodiment.
Figure 16C:
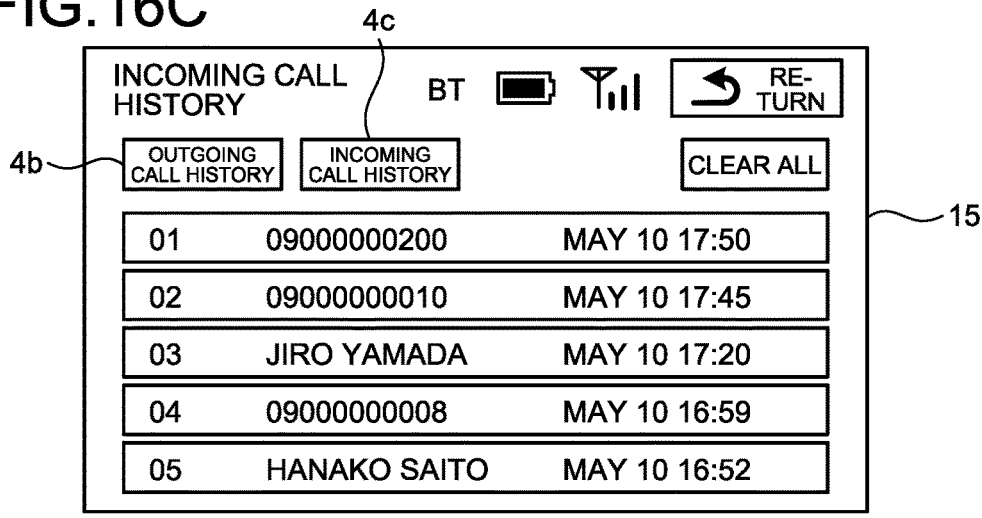
FIG. 16C is a diagram illustrating the example of the display screen transition in the case where the user performs the outgoing call operation from the incoming call history according to the first embodiment.
Figure 17A:
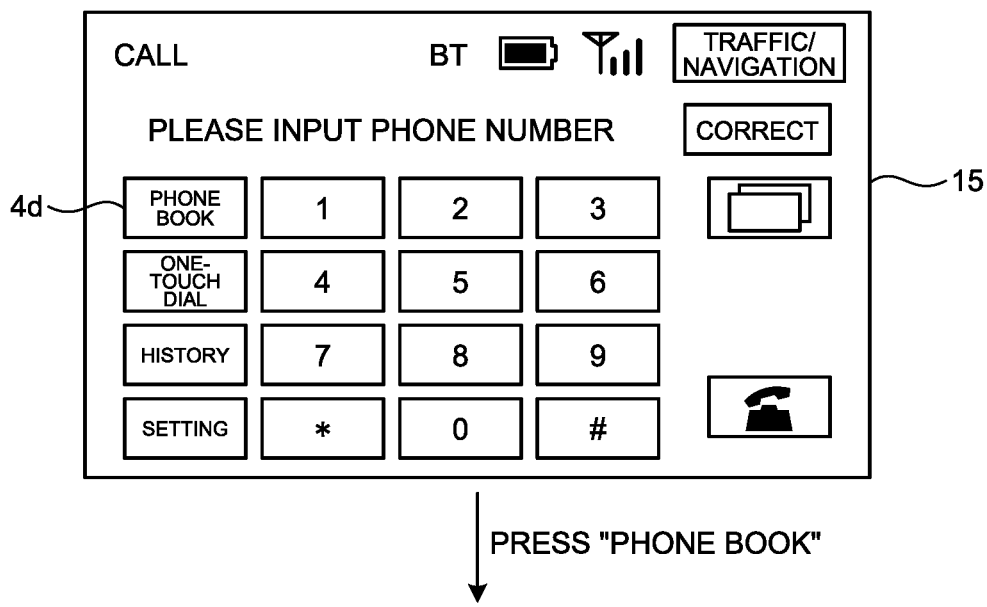
FIG. 17A is a diagram illustrating an example of display screen transition in a case where the user performs the outgoing call operation from a phone book according to the first embodiment.
Figure 17B:
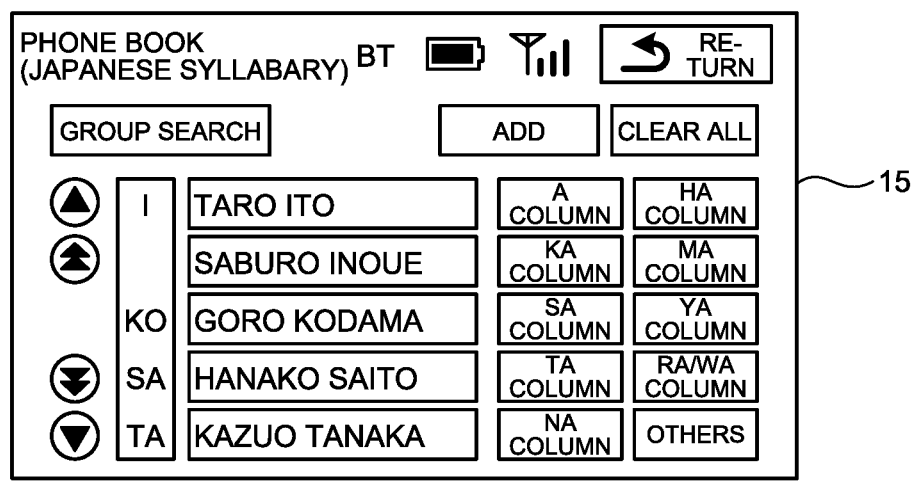
FIG. 17B is a diagram illustrating the example of the display screen transition in the case where the user performs the outgoing call operation from the phone book according to the first embodiment.

Here, FIGS. 13A and 13B described in FIGS. 11 and 12 are diagrams each illustrating an example of the outgoing call history data according to the present embodiment. Further, FIGS. 14A and 14B are diagrams each illustrating an example of the incoming call history data according to the present embodiment. FIGS. 15A to 15C are diagrams illustrating an example of display screen transition in a case where the user performs the outgoing call operation using the outgoing call history according to the present embodiment. FIGS. 16A to 16C are diagrams illustrating an example of display screen transition in a case where the user performs the outgoing call operation using the incoming call history according to the present embodiment. Further, FIGS. 17A and 17B are diagrams illustrating an example of display screen transition in a case where the user performs the outgoing call operation using the phone book according to the present embodiment. FIG. 18 is a diagram illustrating an example of the phone book data according to the present embodiment.

Returning to the flowchart of FIG. 11, first, in a case where it is determined that the mobile phone 2 is within the Bluetooth communication range of the in-vehicle hands-free device 1, and the communication link is established between the Bluetooth communication unit 13 and the mobile phone 2 (S121 "Yes"), the control device 12 of the in-vehicle hands-free device 1 waits for the automatic transfer of the outgoing call history data, the incoming call history data, and the phone book data from the mobile phone 2 to the Bluetooth communication unit 13 (S122).

Then, when it is determined that the outgoing call history data, the incoming call history data, and the phone book data have been automatically transferred from the mobile phone 2 (S122 "Yes"), the control device 12 stores the outgoing call history data, the incoming call history data, and the phone book data automatically transferred from the mobile phone 2 in the working memory 16 or the storage memory 17 (S123).

Here, it is assumed that the numbers of pieces of outgoing call history data and pieces of incoming call history data automatically transferred from the mobile phone 2 are each, for example, 20. Further, it is assumed that the numbers of pieces of outgoing call history data and pieces of incoming call history data that can be stored in the working memory 16 are each, for example, five. That is, the number of pieces of outgoing call history data or pieces of incoming call history data that can be stored in the working memory 16 is smaller than the number of pieces of outgoing call history data or pieces of incoming call history data automatically transferred from the mobile phone 2.

In this case, for example, the control device 12 discards old outgoing call history data among the outgoing call history data automatically transferred from the mobile phone 2, and preferentially stores, as mobile phone-side outgoing call history data, five latest outgoing call history data among 20 outgoing call history data automatically transferred from the mobile phone 2 in the working memory 16. Further, the control device 12 discards old incoming call history data among the incoming call history data, and preferentially stores, as mobile phone-side incoming call history data, five latest incoming call history data among 20 incoming call history data automatically transferred from the mobile phone 2 in the working memory 16.

Immediately after the outgoing call history data are automatically transferred from the mobile phone 2, the control device 12 holds the outgoing call history data illustrated in FIG. 13A as the outgoing call history data in the working memory 16. Further, when the user performs an operation to display the outgoing call history data in this state, the control device 12 causes the display unit 15 to display a display screen illustrated in FIG. 15B. Further, immediately after the incoming call history data are automatically transferred from the mobile phone 2, the control device 12 holds the incoming call history data illustrated in FIG. 14A as the incoming call history data in the working memory 16, and when the user performs an operation to display the incoming call history data in this state, the control device 12 causes the display unit 15 to display a display screen illustrated in FIG. 16B.

As such, once the mobile phone 2 and the in-vehicle hands-free device 1 establish the Bluetooth communication link, the outgoing call history data and the incoming call history data stored before the mobile phone 2 establishes the Bluetooth communication line are automatically transferred to the working memory 16 of the in-vehicle hands-free device 1, and the mobile phone 2 and the in-vehicle hands-free device 1 form one phone system which enables a hands-free call. Further, after the mobile phone 2 and the in-vehicle hands-free device 1 form one phone system as described above, the user can select and perform any one of an outgoing call operation using an input through the dial keys, an outgoing call operation using the outgoing call history, an outgoing call operation using the incoming call history, and an outgoing call operation using the phone book, and can wait for an incoming call from the mobile phone network.

Here, in the present embodiment, as a procedure for the Bluetooth communication, after the wireless communication connection using the PBAP is performed in S7 in the flowchart of FIG. 5, serial profile switching, in which the wireless communication using the PBAP is disconnected in S24, and wireless communication connection using the HFP is performed in S25, is performed. Therefore, in a case where there is a new incoming call to the mobile phone 2 or new outgoing call processing is performed by the operation unit 14 after the wireless communication connection using the HFP is performed in S25, since incoming call history data including the new incoming call and outgoing call history data including the new outgoing call are history data of the mobile phone 2, the mobile phone 2 stores them in a memory thereof. Therefore, the control device 12 of the in-vehicle hands-free device 1 again performs the wireless communication (simultaneous connection) using the PBAP during the wireless communication using the HFP in order to acquire these latest outgoing/incoming call history data from the mobile phone 2.

However, for example, in a case where the simultaneous connection is to be avoided as much as possible, when the wireless communication connection using the HFP is disconnected and the wireless communication connection using the PBAP is performed in the serial connection, the mobile phone 2 and the in-vehicle hands-free device 1 that form one phone system to perform a hands-free call are substantially separated from each other, and thus the hands-free call cannot be performed. Therefore, in the present embodiment, when the wireless communication connection using the HFP is performed in S25, the latest outgoing/incoming call history data are directly acquired and managed by the in-vehicle hands-free device 1 only through the wireless communication using the HFP from then on. This will be described below.

Returning to the flowchart of FIG. 11, the control device 12 determines whether or not the user has performed the outgoing call operation using an input through the dial keys (S124), and determines whether or not the user has performed the outgoing call operation using the outgoing call history (S125). Here, as continued in the flowchart of FIG. 12, the control device 12 determines whether or not the user has performed the outgoing call operation using the incoming call history (S126), determines whether or not the user has performed the outgoing call operation using the phone book (S127), and determines whether or not an incoming call is received from the mobile phone network (S128).

Here, in a case where it is determined that the user has performed the outgoing call operation using an input through the dial keys (S124 "YES"), the control device 12 performs outgoing call processing of making an outgoing call by using, as the outgoing call phone number, a phone number input by the user through the dial keys (S129). Then, when the outgoing call processing using an input through the dial keys ends, the control device 12 erases the oldest outgoing call history data among the outgoing call history data stored in the working memory 16 at this point in time as illustrated in FIG. 13B (S130), and additionally stores, as own outgoing call history data, the latest outgoing call history data of the own device that indicates an outgoing call made by using an input through the dial keys, in the working memory 16 (S131).

That is, when the user operates the dial keys to input, for example, a phone number "09000000100" and performs an operation of making an outgoing call to the phone number "09000000100" as the outgoing call phone number, the control device 12 additionally stores, as the own outgoing call history data, outgoing call history data indicating the phone number "09000000100" in the working memory 16 as illustrated in FIG. 13B. In this case, the control device 12 stores, as a timestamp, a date and time acquired as an outgoing call date and time corresponding to the phone number "09000000100" by the GPS device of the in-vehicle hands-free device 1. That is, in FIG. 13B, an outgoing call date and time of the latest phone number "09000000100" is a date and time acquired by the GPS device of the in-vehicle hands-free device 1, and outgoing call dates and times of the remaining four phone numbers are dates and times acquired by the clock unit of the mobile phone 2. Further, when the user performs an operation to display the outgoing call history data in this state, the control device 12 causes the display unit 15 to display a display screen illustrated in FIG. 15C.

Further, when the user presses a "history button" 4a and then presses an "outgoing call history button" 4b, the control device 12 determines that the user has performed the outgoing call operation using the outgoing call history (S125 "YES"), and in this case, the control device 12 refers to the outgoing call history data stored in the working memory 16 (S132), refers to the phone book data stored in the working memory 16 (S133), and causes the display unit 15 to display the outgoing call operation screen using the outgoing call history as illustrated in FIGS. 15B and 15C (S134). In this case, when the outgoing call phone number of the outgoing call history data is registered in the phone book data, the control device 12 causes the display unit 15 to display a registration name corresponding to the phone number, and when the outgoing call phone number of the outgoing call history data is not registered in the phone book data, the control device 12 causes the display unit 15 to display the phone number.

Next, the control device 12 performs the outgoing call processing of making an outgoing call by using a phone number selected as the outgoing call phone number by the user (S135). Then, also in this case, when the outgoing call processing using the outgoing call history ends, the control device 12 erases the oldest outgoing call history data among the outgoing call history data stored in the working memory 16 at this point in time (S130), and additionally stores, as the own outgoing call history data, the latest outgoing call history data of the own device that indicates an outgoing call made by using the outgoing call history, in the working memory 16 (S131). Also in this case, the control device 12 stores, as a timestamp, a date and time acquired as an outgoing call date and time corresponding to the outgoing call phone number by the GPS device of the in-vehicle hands-free device 1.

Further, when the user presses the "history button" 4a and then presses an "incoming call history button" 4c, the control device 12 determines that the user has performed the outgoing call operation using the incoming call history (S126 "YES"), and in this case, the control device 12 refers to the incoming call history data stored in the working memory 16 (S136), refers to the phone book data stored in the working memory 16 (S137), and causes the display unit 15 to display the outgoing call operation screen using the incoming call history as illustrated in FIGS. 16B and 16C (S138). In this case, when the outgoing call phone number of the incoming call history data is registered in the phone book data, the control device 12 causes the display unit 15 to display a registration name corresponding to the phone number, and when the outgoing call phone number of the incoming call history data is not registered in the phone book data, the control device 12 causes the display unit 15 to display the phone number.

Next, the control device 12 performs the outgoing call processing of making an outgoing call by using a phone number selected as the outgoing call phone number by the user (S139). Then, also in this case, when the outgoing call processing using the incoming call history ends, the control device 12 erases the oldest outgoing call history data among the outgoing call history data stored in the working memory 16 at this point in time (S130), and additionally stores, as the own outgoing call history data, the latest outgoing call history data of the own device that indicates an outgoing call made by using the incoming call history, in the working memory 16 (S131). Also in this case, the control device 12 stores, as a timestamp, a date and time acquired as an outgoing call date and time corresponding to the outgoing call phone number by the GPS device of the in-vehicle hands-free device 1.

Further, when the user presses a "phone book button" 4d, the control device 12 determines that the user has performed the outgoing call operation using the phone book (S127 "YES"), and in this case, the control device 12 refers to the phone book data stored in the working memory 16 (S140), and causes the display unit 15 to display the outgoing call operation screen using the phone book as illustrated in FIG. 17B (S141). Next, the control device 12 performs the outgoing call processing of making an outgoing call by using a phone number selected as the outgoing call phone number by the user from the phone book data (S142). Then, also in this case, when the outgoing call processing using the phone book ends, the control device 12 erases the oldest outgoing call history data among the outgoing call history data stored in the working memory 16 at this point in time (S130), and additionally stores, as the own outgoing call history data, the latest outgoing call history data of the own device that indicates an outgoing call made by using the phone book, in the working memory 16 (S131). Also in this case, the control device 12 stores, as a timestamp, a date and time acquired as an outgoing call date and time corresponding to the outgoing call phone number by the GPS device of the in-vehicle hands-free device 1.

Further, when it is determined that a call is received from the mobile phone network from the mobile phone 2 via the Bluetooth communication unit 13 (S128 "YES"), the control device 12 performs the incoming call processing such as notification of the incoming call (S143), and when the incoming call processing ends, the control device 12 erases the oldest incoming call history data among the incoming call history data stored in the working memory 16 at this point in time (S144), and additionally stores, as own incoming call history data, the latest incoming call history data of the own device that indicates the incoming call, in the working memory 16 (S145).

That is, when a call from a phone number "09000000200" as the incoming call phone number is received from the mobile phone network via the Bluetooth communication unit 13, the control device 12 additionally stores, as the own incoming call history data, incoming call history data indicating the phone number "09000000200" in the working memory 16.

By doing so, even in a case where the wireless communication connection using the PBAP is not performed after the wireless communication connection using the HFP is performed in S25, when new incoming call processing or outgoing call processing in S1 or subsequent steps is performed, it is possible to add the own outgoing/incoming call history data, and causes the display unit 15 to display the own outgoing/incoming call history data. As a result, simultaneous connection of the HFP and the PBAP can be avoided, and it is not necessary to disconnect the wireless communication connection using the HFP after the wireless communication connection using the HFP is performed in S25, and then connect the wireless communication using the PBAP. Therefore, it is possible to prevent the mobile phone 2 and the in-vehicle hands-free device 1 that form one phone system from being substantially separated from each other.

Next, processing of display the outgoing/incoming call history data received through the wireless communication using the PBAP, and the outgoing/incoming call history data generated through the outgoing call processing and the incoming call processing after S25 will be described.

In a state where the wireless connection using the HFP is established in S25, the mobile phone 2 transmits the incoming call phone number to the in-vehicle hands-free device 1 when receiving an incoming call, but does not transmit information on the incoming date and time at this time. Therefore, the control device 12 stores, as a timestamp, a date and time acquired as the incoming call date and time corresponding to the phone number "09000000200" by the GPS device of the in-vehicle hands-free device 1. That is, in FIG. 14B, the incoming call date and time of the latest phone number "09000000200" is a date and time acquired by the GPS device of the in-vehicle hands-free device 1, and incoming call dates and times of the remaining four phone numbers are dates and times acquired by the clock unit of the mobile phone 2. Further, when the user performs an operation to display the incoming call history data in this state, the control device 12 causes the display unit 15 to display a display screen illustrated in FIG. 16C.

Although a case where, when the number of pieces of outgoing call history data or pieces of incoming call history data that can be stored in the working memory 16 is smaller than the number of pieces of outgoing call history data or pieces of incoming call history data automatically transferred from the mobile phone 2, among the pieces of outgoing call history data or pieces of incoming call history data automatically transferred from the mobile phone 2, the oldest outgoing call history data or the oldest incoming call history data is discarded, and the latest outgoing call history data or the latest incoming call history data is preferentially stored in the working memory 16 has been described above, the in-vehicle hands-free device 1 may designate the number of pieces of data to be automatically transferred to the mobile phone 2 (five in this embodiment) when the wireless communication using the PBAP is connected, and may preferentially store the latest outgoing call history data or the latest incoming call history data in the working memory 16.

Further, in the above configuration, although a case where the oldest outgoing call history data or the oldest incoming call history data stored in the working memory 16 is erased when new outgoing call processing or new incoming call processing is performed in the in-vehicle hands-free device 1 has been described, the control device 12 may also perform the following alternative processing on the basis of demands of the user as described below. This is processing required when the wireless communication connection using the PBAP is not performed after S25 as in this example.

That is, comparing the date and time measured by the clock unit of the mobile phone 2 with the date and time acquired by the GPS device of the in-vehicle hands-free device 1, the date and time measured by the clock unit of the mobile phone 2 may have a wider margin of error and be more inaccurate as compared with the date and time acquired by the GPS device, and since the date and time can be arbitrarily set by the user, the user may intentionally set the time forward or back a predetermined time (for example, 10 minutes).

Therefore, for example, in a case where the user sets the time on the mobile phone 2 forward by a predetermined time, and the in-vehicle hands-free device 1 stores the time set forward in the working memory 16, when the outgoing call history data or incoming call history data automatically transferred from the mobile phone 2, and the own outgoing call history data or incoming call history data of the in-vehicle hands-free device 1 are sorted from the latest to the oldest in this state, the outgoing call history data or incoming call history data subjected to new outgoing call processing or new incoming call processing in the in-vehicle hands-free device 1 is not displayed in the uppermost row in a list display screen, but is displayed in rows (for example, the second or third uppermost row) other than the uppermost row, despite the outgoing call history data or incoming call history data subjected to new outgoing call processing or new incoming call processing is the latest data on a time axis. In this case, the time axis that the user remembers and the time axis displayed by the display unit 15 are deviated from each other, and the user feels a sense of incompatibility.

In order to deal with such a problem, the control device 12 arranges and displays the outgoing call history data or incoming call history data automatically transferred from the mobile phone 2 from the latest to the oldest in the rows other than the uppermost row, and displays new outgoing call history data or new incoming call history data of the own device in the uppermost row. As a result, the data can be displayed in harmony with the time axis that the user remembers, and it is possible to prevent the user from feeling a sense of incompatibility.

When arranging and displaying the outgoing call history data or incoming call history data automatically transferred from the mobile phone 2 from the latest to the oldest, in a case where outgoing call order data indicating the order of the outgoing calls or incoming call order data indicating the order of the incoming calls is included in the outgoing call history data or incoming call history data, the control device 12 may arrange and display the outgoing call history data or incoming call history data on the basis of the outgoing call history data or incoming call history data without sorting the outgoing call history data or incoming call history data according to date and time data included in the outgoing call history data or incoming call history data.

In addition, even in a case where the outgoing call order data and the incoming call order data are not explicitly included, when data in a list format is transmitted from the mobile phone 2 as illustrated in FIGS. 7A, 8A, and 9A, and the in-vehicle hands-free device 1 receives the data, the data may be displayed according to a rule that data are displayed from the latest to the oldest from top to bottom. That is, the mobile phone 2 transmits data in a format in which the actual order of the outgoing calls or incoming calls can be identified in the in-vehicle hands-free device 1.

In this case, for example, in some mobile phones 2 in which the timestamp records the time down to minutes, instead of seconds, in a case where there was an incoming call from Mr. A at 12:00:00 and there was an incoming call from Mr. B at 12:00:30, the times of both incoming calls become exactly the same as each other (that is, 12:00), and the data including these times are stored as the incoming call history data of the mobile phone 2. Then, even when the data are received by the in-vehicle hands-free device 1 and sorted from the newest to the oldest, the order of the data cannot be determined. Therefore, the mobile phone 2 may provide the outgoing call order data or incoming call order data or transmit the data in a list format to improve convenience. As a result, the data can be displayed in harmony with the time axis that the user remembers, and it is possible to prevent the user from feeling a sense of incompatibility.

In these cases, the date and time data included in the outgoing call history data or incoming call history data is adjunctive, and the above-described outgoing call order data or incoming call order data indicates the actual order of the incoming calls or outgoing calls. Further, the mobile phone 2 repeats the incoming call processing or outgoing call processing independently. Since the mobile phone 2 performs the processing independently, the order of the incoming/outgoing calls can be grasped. Therefore, it is possible to manage the outgoing/incoming call history according to the order. Therefore, regardless of the outgoing call date and time or incoming call date and time measured by the clock unit of the mobile phone 2, the outgoing call order data or incoming call order data is added and transmitted to the in-vehicle hands-free device 1 each time an outgoing call is made or each time an incoming call is received, and the in-vehicle hands-free device 1 performs processing so that the outgoing/incoming call history data are arranged on the basis of the incoming call order data or outgoing call order data. Alternatively, the above list made in a manner in which the mobile phone 2 determines the actual order of the outgoing calls or incoming calls without adding the outgoing call order data or incoming call order data is transmitted to the in-vehicle hands-free device 1, and the in-vehicle hands-free device 1 performs processing so that the outgoing/incoming call history data are arranged according to the actual order of the outgoing calls or incoming calls in accordance with the above-described rule.

In this case, for example, when the clock of the mobile phone 2 is set forward or back at a certain timing, and an outgoing call is made or an incoming call is received immediately after the setting, the outgoing call history or incoming call history is displayed according to the actual order in the mobile phone 2, but the outgoing call date and time or incoming date and time added to each data does not match the order according to which the data are displayed. Therefore, when such outgoing/incoming call history data is sorted on the basis of the outgoing call date and time or incoming call date and time in the in-vehicle hands-free device 1, the outgoing/incoming call history data is displayed according to the order different from the actual order. Therefore, it can be said that the method using the outgoing call order data or incoming call order data, or the method using the list format is suitable for arranging the data according to the actual order of the outgoing/incoming calls.

As a result, the control device 12 can display the data on the display unit 15 according to the actual order of the outgoing calls or incoming calls in the mobile phone 2. In the in-vehicle hands-free device 1, in a case where, after performing such data processing, the outgoing call processing using an input through the dial keys thereof, the outgoing call processing using the outgoing call history, the outgoing call processing using the incoming call history, or the outgoing call processing using the phone book data is performed as described above, among the outgoing call history data stored in the working memory 16 at this point in time, outgoing call history data whose outgoing call order data indicates that it is the oldest data, or outgoing call history data that is regarded as the oldest data is erased, and the latest outgoing call history data of the own device that indicates an outgoing call made by using the outgoing call history is additionally stored as the own outgoing call history data in the working memory 16. On the other hand, when new incoming call processing is performed, the control device 12 erases outgoing call history data whose incoming call order data indicates that it is the oldest data, or incoming call history data that is regarded as the oldest data among the incoming call history data stored in the working memory 16 at this point in time, and additionally stores, as the own outgoing call history data, the latest incoming call history data of the own device that indicates an incoming call received by using the incoming call history, in the working memory 16.

In a case of these outgoing call processing and incoming call processing, the control device 12 stores, as timestamps, dates and times acquired as an outgoing call date and time corresponding to the outgoing call phone number and an incoming call date and time corresponding to the incoming call phone number by the GPS device of the in-vehicle hands-free device 1. In this way, the data can be displayed in harmony with the time axis that the user remembers, and it is possible to prevent the user from feeling a sense of incompatibility.

Further, when a request for displaying the all history data in which the outgoing call history data and the incoming call history data are collectively displayed is received, the control device 12 needs to perform predetermined sorting processing, unlike a case where only the outgoing call history data or incoming call history data is displayed. That is, in a case where the incoming call history data and outgoing call history data are transmitted from the mobile phone 2 in a manner in which the outgoing call order data and incoming call order data are included so as to enable identification of the latest data on the actual time axis, or data in the list format are transmitted without including these data as described above, when the in-vehicle hands-free device 1 displays the received data according to the notified order without being based on the outgoing call date and time and incoming call date and time included in the received data, the data are displayed according to the display order in the mobile phone 2 in a case where only the outgoing call history or only the incoming call history is displayed.

Here, in a case where the all history data is displayed, the latest data among the outgoing call history data and the latest data among the incoming call history data can be grasped in the in-vehicle hands-free device 1, but it may be difficult to identify which one of the two latest data is the later data. Therefore, in this example, in a case where the all history data is displayed, the control device 12 compares the outgoing call date and time included in the outgoing call history data with the incoming call date and time included in the incoming call history data, and displays the later one as the latest data. For example, in a case of five pieces of incoming call history data and five pieces of outgoing call history data, the control device 12 sorts and displays 10 pieces of data from the latest to the oldest. As a result, in most cases, it is possible to display the outgoing call history data and the incoming call history data from the latest to the oldest almost on the actual time axis of the user. However, in a case where the timestamp function in the mobile phone 2 records the time down to "minute", when there is an incoming call from Mr. A at 12:00:00, and an outgoing call is made to Mr. B at 12:00:30, the outgoing call date and time and the incoming call date and time are exactly the same as each other (that is, 12:00). Therefore, in this case, the control device 12 performs predetermined sorting processing of displaying the outgoing call as the later call than the incoming call, or displaying the incoming call as the later call than the outgoing call.

Further, in a case where the order of three incoming call history data (A to C) received through the wireless communication using the PBAP can be grasped as described above, and the order of the outgoing call history data (D to F) received by using the PBAP can be grasped, the control device 12 compares the dates and times of the outgoing call history data and the incoming call history data as follows to perform the sorting processing.

First, the control device 12 compares the dates and times of A and D to identify the latest data (for example, A), and then compares B and D to identify the second latest data (for example, B). Next, the control device 12 compares the dates and times of C and D to identify the third latest data (for example, D), and then compares C and E to identify the fourth latest data (for example, C). As for the remaining E and F, since E is the later data, the control device 12 identifies E as the fifth latest data, and identifies F as the sixth latest data. In a case where the compared dates and times are the same as each other, the control device 12 performs sorting so that the outgoing call history data is displayed above the incoming call history data, or the incoming call history data is displayed above the outgoing call history data, as a predetermined sorting rule.

Further, when transferring the phone book data, the mobile phone 2 needs to convert the data format of the phone book data into a "vCard" data format specified as the Bluetooth communication protocol and then transfer the phone book data whose data format is converted. In addition, the phone book data is generally updated less frequently as compared to the outgoing call history data and the incoming call history data. Therefore, the control device 12 may first receive the outgoing call history data and the incoming call history data from the mobile phone 2 through the Bluetooth communication unit 13, and then receive the phone book data from the mobile phone 2 through the Bluetooth communication unit 13. Further, the control device 12 may receive the outgoing call history data and the incoming call history data from the mobile phone 2 through the Bluetooth communication unit 13, and then receive the phone book data from the mobile phone 2 through the Bluetooth communication unit 13 only when the user performs a predetermined operation on the operation unit 14.

Further, whether to transfer the phone book data through such a user operation or automatically transfer the phone book data may be set by the user selecting manual transfer or automatic transfer in the in-vehicle hands-free device 1, and the transfer processing may be performed according to the setting. In a state where the automatic transfer is set to "not transfer", the user can perform a manual transfer operation to transfer only the phone book data after the wireless connection using the HFP is established in S9. However, due to the manual transfer operation, the wireless communication connection using the HFP in S9 is disconnected and the wireless communication connection using the PBAP is performed, and when the data transfer is completed, the wireless communication using the HFP is connected to the mobile phone 2 again to enable a hands-free call.

In a case where the automatic transfer is set to "not transfer", the outgoing call history data and incoming call history data with a high data update frequency can be received with priority over the phone book data with a low data update frequency, and since the data conversion need not be performed to transfer the outgoing call history data and the incoming call history data, whereas the data conversion needs to be performed to transfer the phone book data, the outgoing call history data and incoming call history data whose transfer time is short can be received with priority over the phone book data whose transfer time is long. Further, by transferring only the outgoing call history data and the incoming call history data, the amount of data to be transferred can be reduced. As a result, communication using the transfer protocol can be performed at an early stage, and subsequent communication using the hands-free protocol can be performed at an early stage. Therefore, a time required to make a hands-free call when a mobile phone is brought into a vehicle can be shortened. In addition, it is possible to select whether or not to receive the phone book data of which the update frequency is low and the transfer time is long as needed, thereby improving convenience.

In a case where the phone book data is transferred as needed through the manual transfer operation performed by the user, once the transfer is completed, communication using the hands-free protocol is automatically performed. Therefore, it is possible to make a hands-free call when making an outgoing call using the phone book data. As a result, convenience is improved. In addition, when the phone book data is transferred through the manual transfer operation, only the phone book data may be stored in the non-volatile storage memory 17, and the stored data may be read from the storage memory 17 and used as the phone book data at the time of the next activation of the in-vehicle hands-free device 1.

Further, the control device 12 may store, in the working memory 16, the outgoing call history data, the incoming call history data, and the phone book data received from the mobile phone 2 for each mobile phone 2. In this case, the control device 12 associates the mobile phone 2 with the data stored in the working memory 16 as follows, for example. That is, when the outgoing call history data, the incoming call history data, and the phone book data received from the mobile phone 2 are stored in the working memory 16, a link key is generated on the basis of a mobile phone ID assigned to and received from each mobile phone 2, and a device ID assigned to the in-vehicle hands-free device 1, and the generated link key and various data are stored in the working memory 16 in association with each other. Then, when the control device 12 receives the mobile phone ID from the mobile phone 2 thereafter, the control device 12 regenerates the link key on the basis of the received mobile phone ID and the device ID, and updates various data associated with the generated link key and stored in the working memory 16.

Next, the HFP processing in S2 in the flowchart of FIG. 5 described above will be described in detail. FIG. 19 is a flowchart illustrating details of a flow of the HFP processing according to the present embodiment.

In a case where it is determined that the communication link has been established with the mobile phone 2 that is in the Bluetooth communication range, the control unit 102 (hands-free call connection control unit 111) connects (starts) the wireless communication using the HFP (S151), and determines whether or not the mobile phone 2 is in a call (S152). Further, notification of whether the mobile phone 2 is in a call or in standby is made through the wireless communication using the HFP, and is received by the in-vehicle hands-free device 1, and determination is made according to the received communication state. Further, S151 corresponds to the processing in S2.

Here, in a case where it is determined that the mobile phone 2 is not in a call, that is, the mobile phone 2 is in standby for an incoming call (S152 "No"), the control unit 102 (hands-free call connection control unit 111) disconnects (terminates) the wireless communication using the HFP (S154), and the control unit 102 (data transfer control unit 112) connects the wireless communication using the PBAP (S155). That is, in a case where the mobile phone 2 is not in a call, the control unit 102 (hands-free call connection control unit 111) promptly and automatically disconnects the connected wireless communication using the HFP and automatically connects the wireless communication using the PBAP, such that the outgoing call history data, the incoming call history data, and the phone book data transmitted from the mobile phone 2 are received through the Bluetooth communication unit 13.

Further, in a case where it is determined that the mobile phone 2 is in a call (S152 "YES"), the control unit 102 (hands-free call connection control unit 111) maintains the wireless communication using the HFP in consideration of a possibility that a hands-free call using the in-vehicle hands-free device 1 is performed for the call. Further, whether or not to perform the call basically depends on the mobile phone 2. When the wireless communication connection using the HFP is performed while the mobile phone 2 is in a call, a received voice may be transmitted to the Bluetooth communication unit 13 automatically or through an operation in the mobile phone 2.

Then, the control unit 102 (hands-free call connection control unit 111) determines whether or not the call has been terminated on the mobile phone 2 (S153), and in a case where it is determined that the call has been terminated on the mobile phone 2 (S153 "Yes"), the control unit 102 (hands-free call connection control unit 111) disconnects (terminates) the connected wireless communication using the HFP (S154 "No"), and the control unit 102 (data transfer control unit 112) connects the wireless communication using the PBAP (S155). That is, in a case where the mobile phone 2 is in a call, the control unit 102 (hands-free call connection control unit 111) disconnects the connected wireless communication using the HFP after the call is terminated and connects the wireless communication using the PBAP, such that the outgoing call history data, the incoming call history data, and the phone book data transmitted from the mobile phone 2 after the user terminates the hands-free call are received through the Bluetooth communication unit 13. Further, S152 and S153 correspond to the processing between S3 and S4.

When the mobile phone 2 is connected to the in-vehicle hands-free device 1 in this way, the in-vehicle hands-free device 1 determines whether or not the mobile phone 2 is in a call, and in a case where the mobile phone 2 is in a call, the wireless communication using the HFP is maintained and the wireless communication connection using the PBAP is not performed while the mobile phone 2 is in a call, because a hands-free call cannot be performed when switching from the wireless communication using the HFP to the wireless communication using the PBAP is made. Then, in a case where it is determined that the call has been terminated, the wireless communication using the HFP is disconnected and the wireless communication connection using the PBAP is performed. As a result, when the mobile phone 2 is in a call independently, switching to a hands-free call can be smoothly made.

Figure 20A:
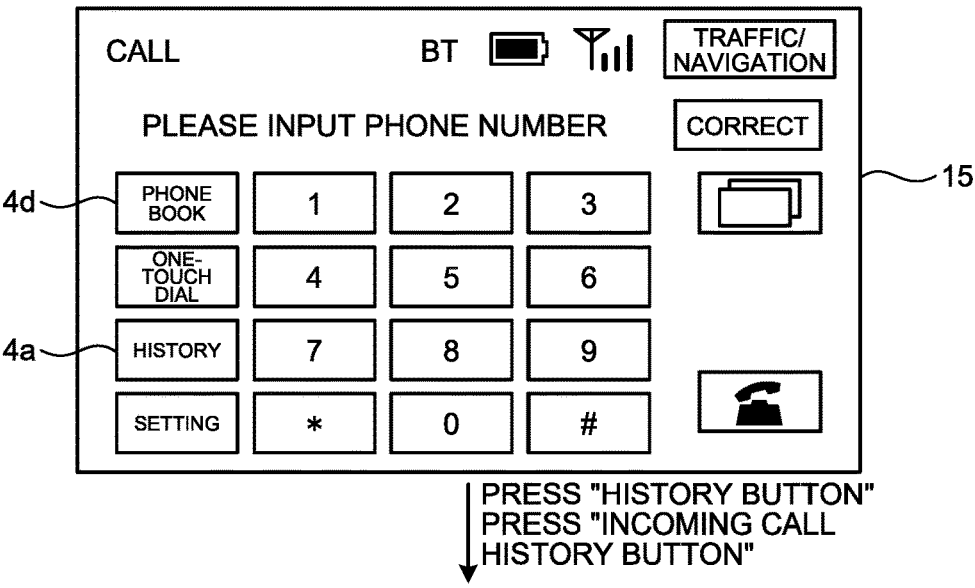
FIG. 20A is a diagram illustrating another example of the display screen transition in a case where the user performs the outgoing call operation from the incoming call history according to the first embodiment.
Figure 20B:
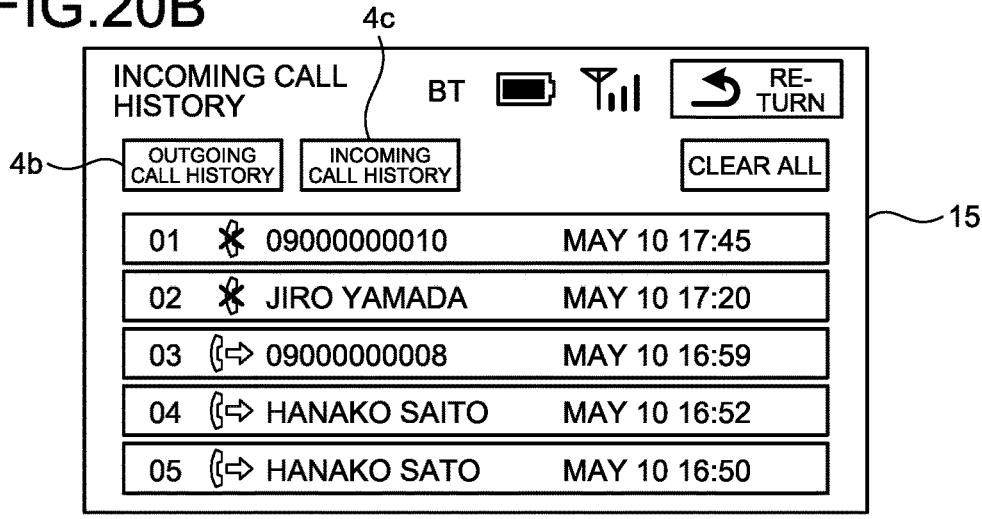
FIG. 20B is a diagram illustrating another example of the display screen transition in the case where the user performs the outgoing call operation from the incoming call history according to the first embodiment.
Figure 20C:
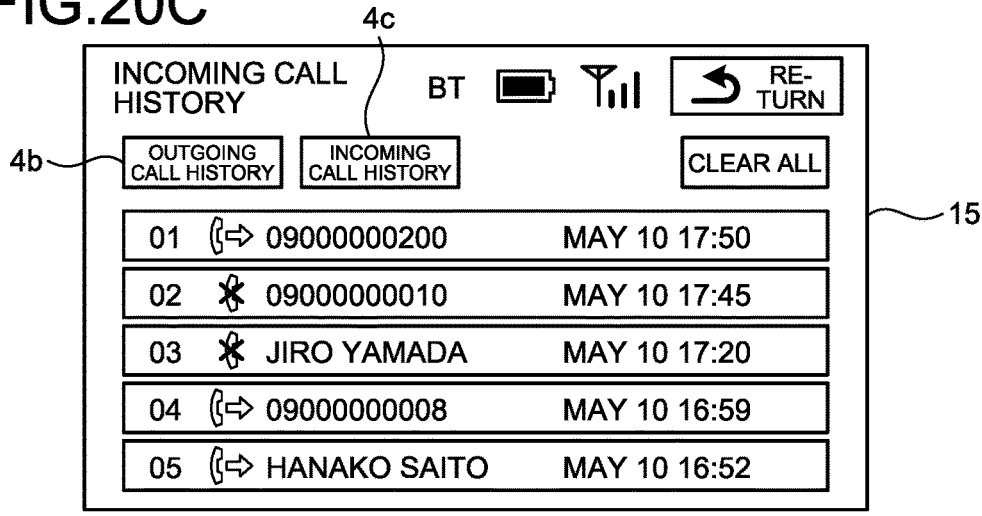
FIG. 20C is a diagram illustrating another example of the display screen transition in the case where the user performs the outgoing call operation from the incoming call history according to the first embodiment.

Further, the control device 12 may separately receive the accepted incoming call history as the incoming call history data and the unaccepted incoming call (missed call) history from the mobile phone 2 and store them. FIGS. 20A to 20C are diagrams illustrating another example of the display screen transition in a case where the user performs the outgoing call operation using the incoming call history according to the present embodiment. When the user presses the "history button" 4*a* and then presses the "incoming call history button" 4*c*, the control device 12 determines that the outgoing call operation using the incoming call history has been performed, and in this case, the control device refers to the incoming call history data stored in the working memory 16, refers to the phone book data stored in the working memory 16, and causes the display unit 15 to display the outgoing call operation screen using the incoming call history as illustrated in FIGS. 20B and 20C, and any one of an icon indicating the accepted incoming call (a figure consisting of a combination of an image of a receiver and an arrow) and an icon indicating the unaccepted incoming call (a figure consisting of a combination of an image of a receiver and an x mark) is displayed for each data.

A case where the outgoing call history data, the incoming call history data, and the phone book data transferred from the mobile phone 2 are stored in the working memory 16 and a case where the phone book data is stored in the storage memory 17 have been described in the present embodiment. However, the outgoing call history data, the incoming call history data, and the phone book data transferred from the mobile phone 2 may also be stored in the storage memory 17. In such a configuration, the outgoing call history data, the incoming call history data, and the phone book data stored in the storage memory 17 are retained even when the power supply of the in-vehicle hands-free device 1 is turned off.

As described above, as a more reliable processing procedure using the HFP and the PBAP, the in-vehicle hands-free device 1 of the present embodiment performs a serial connection, in which the HFP and the PBAP are temporally divided, in order to prevent simultaneous connection of the HFP and the PBAP as much as possible. As a result, it is possible to reliably and stably perform communication processing for mobile phones that support the HFP and the PBAP and are manufactured by many manufacturers. In addition, it is possible to perform the processing for the PBAP and the HFP in a simple manner without complicating the processing in the in-vehicle hands-free device 1.

Further, in a case where the condition for making an emergency call is satisfied, the in-vehicle hands-free device 1 of the present embodiment makes the emergency call via the mobile phone 2, and once the termination of the call to an emergency call destination is detected, the in-vehicle hands-free device 1 performs a control to transfer the emergency history data indicating a history related to emergency calls from the mobile phone 2 to the in-vehicle hands-free device 1. Then, the in-vehicle hands-free device 1 of the present embodiment performs a control to transfer the emergency history data, and then performs a control to display an outgoing call operation screen through which the outgoing call operation using the emergency call history can be performed according to the operation performed by the user. As a result, for example, after making an emergency call in an emergency such as an accident, the user can easily make an emergency call to the same emergency call destination again. For example, since redialing can be easily performed in an emergency, the user can talk to an operator who was contacted immediately before. Therefore, it is possible to improve the convenience of the user when an accident occurs.

Further, in a case where an outgoing call is made to the mobile phone network or an incoming call is received from the mobile phone network when the wireless communication connection using the HFP is performed after the wireless communication using the PBAP is disconnected, the in-vehicle hands-free device 1 of the present embodiment erases the oldest outgoing call history data or the oldest incoming call history data among the outgoing call history data or incoming call history data stored in the working memory 6 at this point in time, and additionally stores outgoing call history data or incoming call history data of the own device in the working memory 6. As a result, the latest outgoing call history data or the latest incoming call history data of the own device can be stored each time an outgoing call is made to the mobile phone network or an incoming call is received from the mobile phone network.

Further, after the communication link is established with the mobile phone 2, the in-vehicle hands-free device 1 of the present embodiment determines whether or not the mobile phone 2 is in a call after the HFP connection is performed in S2, and in a case where the mobile phone 2 is in a call, the in-vehicle hands-free device 1 connects the wireless communication using the PBAP after the call is terminated, and receives the outgoing call history data, the incoming call history data, and the phone book data from the mobile phone 2. As a result, a hands-free call can be performed without being affected by the transfer of the outgoing call history data, the incoming call history data, and the phone book data from the mobile phone 2.

Further, once the Bluetooth communication link is established with the mobile phone 2, and the outgoing call history data or incoming call history data stored before the mobile phone 2 establishes the Bluetooth communication link is received from the mobile phone 2, the in-vehicle hands-free device 1 of the present embodiment stores the outgoing call history data or incoming call history data in the working memory 16 equivalently to the outgoing call history data or incoming call history data of the own device, and from then on, the outgoing call operation using the outgoing call history data or incoming call history data stored in the working memory 16 can be performed. As a result, a desired phone number can be selected from the outgoing call history data and the incoming call history data automatically transferred from the mobile phone 2 to make an outgoing call, and a desired phone number can be selected also from the outgoing call history data and the incoming call history data of the own device, which can improve convenience.

Further, when a request for displaying the outgoing call history data or incoming call history data is received, in a case where the same phone number as the outgoing/incoming phone number stored as the outgoing call history data or incoming call history data in the working memory 16 is stored, the in-vehicle hands-free device 1 of the present embodiment displays a registration name corresponding to the phone number. As a result, the outgoing call history data or incoming call history data received from the mobile phone 2 can be displayed with the registration name stored in the phone book data.

In addition, the in-vehicle hands-free device 1 of the present embodiment displays the outgoing call history data of the own device as the latest outgoing call history data in a display screen on which a list of the outgoing call history data is displayed each time the outgoing call processing is performed. In addition, the in-vehicle hands-free device 1 of the present embodiment displays the incoming call history data of the own device as the latest incoming call history data in a display screen on which a list of the incoming call history data is displayed each time the incoming call processing is performed. As a result, even in a case where the date and time acquired by the mobile phone 2 and the date and time acquired by the in-vehicle hands-free device 1 do not match, and the outgoing call date and time of the outgoing call history data or the incoming call date and time of the incoming call history data automatically transferred from the mobile phone 2 and the outgoing call date and time of the outgoing call history data of the own device or the incoming call date and time of the incoming call history data of the own device do not match on the time axis, it is possible to prevent the user from feeling a sense of incompatibility due to the difference in date and time between the devices.

Further, the in-vehicle hands-free device 1 of the present embodiment stores, in the working memory 16, the outgoing call history data, the incoming call history data, and the phone book data for each mobile phone 2. As a result, the outgoing call history data, the incoming call history data, and the phone book data can be managed for each mobile phone 2. Further, the in-vehicle hands-free device 1 of the present embodiment stores, in the storage memory 17, the outgoing call history data, the incoming call history data, and the phone book data for each mobile phone 2. As a result, it is not necessary to receive the phone book data from the mobile phone 2 every time the power supply of the device is turned on, and the user can quickly use the phone book data retained corresponding to the mobile phone 2 of the user, and it is possible to greatly improve the convenience when using the phone book function.

Further, in a case where the outgoing call history data, the incoming call history data, and the missed call history data are collectively displayed as the all history data, the in-vehicle hands-free device 1 of the present embodiment displays only a phone number of the latest outgoing call history data among the outgoing call history data having the same (duplicate) outgoing call phone numbers. As a result, the history information can be increased.

A program executed by the in-vehicle hands-free device 1 of the above-described embodiment is provided by being incorporated in a ROM or the like in advance. The program executed by the in-vehicle hands-free device 1 of each embodiment described above is a file in an installable format or an executable format, and may be provided by being recorded on a computer-readable recording medium such as a CD-ROM, a flexible disk (FD), a CD-R, or a digital versatile disk (DVD).

Further, the program executed by the in-vehicle hands-free device 1 of each embodiment described above may be stored on a computer connected to a network such as the Internet and be provided by being downloaded via the network. Further, the program executed by the in-vehicle hands-free device 1 of each embodiment described above may be provided or distributed via a network such as the Internet.

Second Embodiment

FIG. 1 is a diagram illustrating an example of a usage mode of an in-vehicle hands-free device 1A according to the present embodiment. As illustrated in FIG. 1, the in-vehicle hands-free device 1A of the present embodiment can be mounted on the vehicle 3. The in-vehicle hands-free device 1A performs communication connection with the mobile phone 2. Note that the same functions as those in the first embodiment are denoted by the same reference signs, and a detailed explanation thereof is omitted.

The in-vehicle hands-free device 1A is connected to the mobile phone network via the mobile phone 2. Therefore, for example, the driver of the vehicle 3 can make and receive a call by operating the in-vehicle hands-free device 1A without operating the mobile phone 2. The in-vehicle hands-free device 1A may be implemented as, for example, one function of a hands-free device mounted on the vehicle 3.

Since the hardware configuration of the in-vehicle hands-free device 1A according to the present embodiment is the same as that of the in-vehicle hands-free device 1 of the above-described embodiment, a detailed explanation thereof is omitted.

Figure 21:
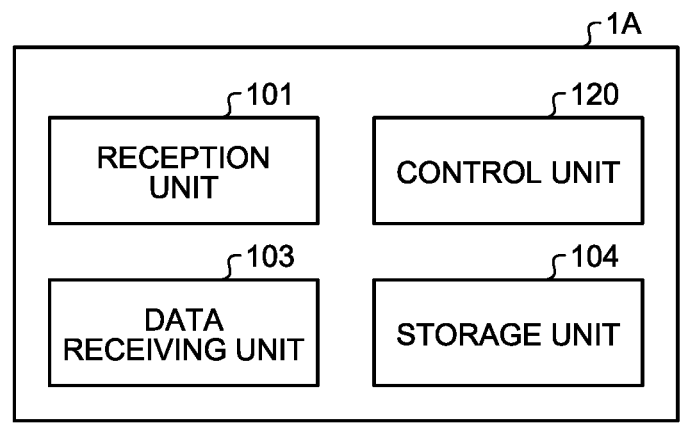
FIG. 21 is a diagram illustrating an example of functions of a hands-free device according to the first embodiment.

Next, the details of the functions of the in-vehicle hands-free device 1A of the present embodiment will be described. FIG. 21 is a diagram illustrating an example of the functions of the in-vehicle hands-free device 1A according to the present embodiment. Note that the functions of the in-vehicle hands-free device 1A are not limited to those in the example of FIG. 21, and the in-vehicle hands-free device 1A may further have other functions. In the example of FIG. 21, the in-vehicle hands-free device 1A of the present embodiment includes a reception unit 101, a control unit 120, a data receiving unit 103, and a storage unit 104.

In the present embodiment, the function of each of the reception unit 101, the control unit 120, and the data receiving unit 103 is implemented by the control device 12 reading a program from the storage memory 17 and executing the program. However, the present disclosure is not limited thereto, and for example, some or all of the functions of the reception unit 101, the control unit 120, and the data receiving unit 103 may be implemented by a dedicated hardware circuit. Further, the storage unit 104 is implemented by, for example, the storage memory 17.

The reception unit 101 and the data receiving unit 103 are the same as those of the in-vehicle hands-free device 1 of the first embodiment. That is, the in-vehicle hands-free device 1A of the present embodiment is the same as the in-vehicle hands-free device 1 of the first embodiment except that the control unit 120 is included instead of the control unit 102.

The control unit 120 performs various controls related to the hands-free function. Similarly to the control unit 102 of the first embodiment, the control unit 120 has a function of connecting to the mobile phone 2 so that a hands-free call can be performed, a function of performing a control related to data transfer using a transfer protocol for implementing the transfer of the incoming call history data, the outgoing call history data, and the phone book data stored in the mobile phone 2 when the mobile phone 2 is in a wireless connection area, and the like.

The transfer protocol is the PBAP. When the connection using the PBAP is interrupted during the transfer of the history data or phone book data, the control unit 120 displays an error and causes the display unit 15 to display a reconnection screen for receiving an input that gives an instruction to reconnect using the PBAP. Then, when the input that gives the instruction to reconnect using the PBAP is received through the reconnection screen, the control unit 120 performs the reconnection using the PBAP. Further, in a case where the mobile phone 2 is set to prohibit or limit the transfer of the history data or phone book data, the control unit 120 causes the display unit 15 to display information (for example, message) indicating that the transfer of the history data or phone book data is not allowed. In this example, it is assumed that security is set in the mobile phone 2 to prohibit or limit the transfer of both history data and phone book data. Details of various functions of the control unit 120 will be described later.

Figure 22:
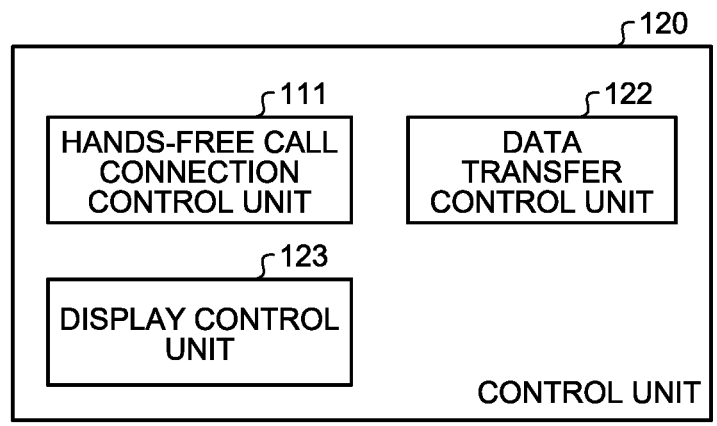
FIG. 22 is a diagram illustrating an example of detailed functions of a control unit of the hands-free device according to the first embodiment.

FIG. 22 is a diagram illustrating an example of detailed functions of the control unit 120. As illustrated in FIG. 22, the control unit 120 includes a hands-free call connection control unit 111, a data transfer control unit 122, and a display control unit 123. Note that the functions of the control unit 120 are not limited thereto, and the control unit 120 may further have other functions for implementing the hands-free function. The hands-free call connection control unit 111 is the same as that of the first embodiment.

The data transfer control unit 122 controls data transfer using the transfer protocol (in this example, the PBAP). In this example, the data transfer control unit 122 also has a function of generating the all history data in which the outgoing call history data, the incoming call history data, and the missed call history data transferred from the mobile phone 2 are collectively displayed from the latest to the oldest. However, the present disclosure is not limited thereto, and for example, the control unit 120 may have a function of generating all history data, separately from the data transfer control unit 122. The display control unit 123 performs a control to display various screens on the display unit 15. For example, the display control unit 123 performs a control to display the reconnection screen, the message, or the like on the display unit 15. The specific contents thereof will be described later.

Note that although various functions of the in-vehicle hands-free device 1A are implemented by one device in the present embodiment, the present disclosure is not limited thereto, and for example, various functions of the in-vehicle hands-free device 1A may be distributed to a plurality of devices. That is, various functions of the in-vehicle hands-free device 1A may be implemented by a system (hands-free system) constituted by a plurality of devices.

Next, the operation of the above-described configuration will be described. In the present embodiment, the description is provided under the assumption that the mobile phone 2 already holds (stores) 20 pieces of outgoing call history data, 20 pieces of incoming call history data, and 20 pieces of missed call history data, 20 each being the maximum number of pieces of storable outgoing call history data, pieces of storable incoming call history data, and pieces of storable missed call history data, and in this state, the user carrying the mobile phone 2 approaches and gets into the vehicle 3, and the ACC switch is turned on, such that the mobile phone 2 enters the Bluetooth communication range of the in-vehicle hands-free device 1A.

First, a procedure in which the control device 12 receives the outgoing call history data, the incoming call history data, the missed call history data, and the phone book data from the mobile phone 2 in the in-vehicle hands-free device 1A will be described with reference to FIG. 23. Further, the user pre-registers the mobile phone 2 as a partner of Bluetooth communication in the in-vehicle hands-free device 1A.

For example, the user inputs a four-digit passcode for each mobile phone 2 to the in-vehicle hands-free device 1A at the time of initial communication setting. The in-vehicle hands-free device 1A and the mobile phone 2 generate a link key used for connection to each other and hold the link key. Then, the in-vehicle hands-free device 1A selects a mobile phone 2 with which communication connection is to be performed by authenticating the link key at the time of initial connection. That is, communication connection using the HFP or communication connection using the PBAP is not performed between the in-vehicle hands-free device 1A and an unregistered mobile phone. Basically, the mobile phone 2 of the owner of the vehicle 3 is pre-registered, and Bluetooth communication is performed between the mobile phone 2 and the in-vehicle hands-free device 1A. Note that the above-described method for the pre-registration of the mobile phone 2 to be communicated with the in-vehicle hands-free device 1A is an example, and the present disclosure is not limited thereto.

In this example, it is assumed that a plurality of mobile phones 2 that may become communication targets are registered in the in-vehicle hands-free device 1A. Further, for example, the user operates the operation unit 14 to preset priorities of the plurality of mobile phones 2, and the working memory 16 or the storage memory 17 stores the priorities. For example, since some drivers may own a plurality of mobile phones 2, it is possible to register the plurality of mobile phones 2 in the in-vehicle hands-free device 1A in this way.

In this example, it is assumed that the Bluetooth communication unit 13 of the in-vehicle hands-free device 1A supports both protocols of wireless communication using the HFP and wireless communication using the PBAP, and simultaneous connection of these two profiles (multi-profile connection) can be made. However, such simultaneous connection processing is not performed on purpose. The reason why the simultaneous connection processing is not performed is the same as that of the in-vehicle hands-free device 1 of the first embodiment.

Similarly to the in-vehicle hands-free device 1 of the first embodiment, as a more reliable processing procedure for wireless communication using the HFP and wireless communication using the PBAP, the in-vehicle hands-free device 1A in this example performs a serial connection, in which wireless communication using the HFP and wireless communication using the PBAP are temporally divided, in order to prevent simultaneous connection of wireless communication using the HFP and wireless communication using the PBAP as much as possible.

Returning to the description, the control unit 120 (hands-free call connection control unit 111) selects a mobile phone 2 having the highest priority as a communication target in wireless communication using the HFP (S21). Here, in this example, initial communication using the HFP is automatically attempted and connection is started without first performing communication connection using the PBAP.

Next, the control unit 120 (hands-free call connection control unit 111) performs processing of automatically connecting the initial communication using the HFP with the selected mobile phone 2 (S22). Further, the control unit 120 (hands-free call connection control unit 111) determines whether or not the wireless communication connection using the HFP is successful (S23).

In a case where it is determined that the wireless communication connection using the HFP is successful (S23 "YES"), the control unit 120 (hands-free call connection control unit 111) automatically disconnects the connected wireless communication using the HFP (S24).

Next, the control unit 120 determines whether or not security is set in the mobile phone 2 to prohibit or limit the transfer of the history data or phone book data (S25). In this example, the control unit 120 determines whether or not security is set in the mobile phone 2 to prohibit or limit the transfer of the history data and the phone book data. Such determination may be performed by, for example, the data transfer control unit 122, or may be performed by another function of the control unit 120. The security set in the mobile phone 2 to prohibit or limit the transfer of the history data and the phone book data includes, for example, a setting for prohibiting an access to the memory of the mobile phone 2.

In a case where a determination result in S25 indicates that the security is set (S25 "YES"), the control unit 120

(display control unit 123) performs a control to display a message indicating that the transfer is not allowed on the display unit 15 (S26). This message may include the reason why the transfer is not allowed. By doing so, the user can know the reason why the history data or phone book data cannot be downloaded, which improves the convenience of the user. In addition, the owner of the mobile phone 2 can be relieved because the owner can confirm that the history data or phone book data in the mobile phone 2 is not unintentionally transferred to the in-vehicle hands-free device 1A. Thereafter, the processing proceeds to S45 to be described later.

Note that, in this example, in a case where the security is set in the mobile phone 2 to prohibit or limit the transfer of the history data and the phone book data, the control unit 120 performs a control to display a message, but the present disclosure is not limited thereto. For example, in a case where security is set in the mobile phone 2 to prohibit or limit only one of the history data and the phone book data, the control unit 120 may perform a control to display a message indicating that the transfer of the one of the history data and the phone book data is not allowed.

In a case where the determination result in S25 indicates that the security is not set (S25, "No"), the control unit 120 (data transfer control unit 122) automatically connects the wireless communication using the PBAP with the mobile phone 2 with which the wireless communication connection using the HFP is successful (S27).

Next, the control unit 120 (data transfer control unit 122) transmits a history data transfer request to start processing of transferring the history data (in this example, the outgoing call history data, the incoming call history data, and the missed call history data) to the mobile phone 2 (S28).

The mobile phone 2 receiving the history data transfer request transfers the history data to the in-vehicle hands-free device 1A through Bluetooth communication using the PBAP. The control unit 120 (data transfer control unit 122) stores the history data transferred (downloaded) from the mobile phone 2 in the working memory 16 or the storage memory 17.

During the transfer of the history data, the control unit 120 (data transfer control unit 122) determines whether or not the connection using the PBAP is interrupted (S29). In a case where it is determined that the PBAP connection is interrupted (S29 "YES"), the control unit 120 (data transfer control unit 122) stops the transfer of the history data (S30). Then, the control unit 120 (display control unit 123) displays an error and performs a control to display, on the display unit 15, the reconnection screen for receiving an input that gives an instruction to reconnect using the PBAP (S31). For example, on the reconnection screen, an icon, a button, or the like for receiving an input of a reconnection instruction may be displayed. In a case where the above-described icon or the like is pressed and the input that gives an instruction to reconnect is received (S32 "YES"), the control device 12 (data transfer control unit 122) reconnects the wireless communication using the PBAP with the mobile phone 2 (S33). Then, the control device 12 (data transfer control unit 122) resumes the transfer of the history data (S34). Thereafter, the processing after S29 is performed. Note that a manner in which the transfer of the history data is resumed in S34 is arbitrary. For example, the transfer of the history data may be resumed from the middle where the interruption has occurred, or the transfer of the history data may be started over from the beginning.

In this way, when the connection using the PBAP is interrupted during the transfer of the history data, the control unit 120 displays an error and displays the reconnection screen for receiving an input that gives an instruction to reconnect using the PBAP. Then, when the input that gives the instruction to reconnect using the PBAP is received through the reconnection screen, the control unit 120 performs the reconnection using the PBAP. With this configuration, the user can recognize the interruption of the connection using the PBAP (occurrence of an error) during the transfer of the history data, and can select whether or not to perform the reconnection using the PBAP. As a result, the convenience of the user is improved. Further, for example, on the above-described reconnection screen, an icon or the like for receiving an input that gives an instruction to cancel the reconnection is displayed, and when the input that gives the instruction to cancel the reconnection is received, the control unit 120 (data transfer control unit 122) may cancel the reconnection using the PBAP.

In S29 described above, in a case where it is determined that the PBAP connection is not interrupted (S29 "No"), the control unit 120 (data transfer control unit 122) determines whether or not the transfer of the history data is completed (S35). In a case where it is determined that the transfer of the history data is completed (S35 "YES"), the control unit 120 (data transfer control unit 122) transmits, to the mobile phone 2, a phone book data transfer request to start phone book data transfer processing (S36).

The mobile phone 2 receiving the phone book data transfer request transfers the phone book data to the in-vehicle hands-free device 1A through Bluetooth communication using the PBAP. The control unit 120 (data transfer control unit 122) stores the phone book data transferred from the mobile phone 2 in the working memory 16 or the storage memory 17.

During the transfer of the phone book data, the control unit 120 (data transfer control unit 122) determines whether or not the connection using the PBAP is interrupted (S37). In a case where it is determined that the PBAP connection is interrupted (S37 "YES"), the control unit 120 (data transfer control unit 122) stops the transfer of the phone book data (S38). Then, the control unit 120 (display control unit 123) displays an error and performs a control to display, on the display unit 15, the reconnection screen for receiving an input that gives an instruction to reconnect using the PBAP (S39). In a case where the input that gives the instruction to reconnect is received through the reconnection screen (S40 "YES"), the control unit 120 (data transfer control unit 122) reconnects the wireless communication using the PBAP with the mobile phone 2 (S41). Then, the control unit 120 (data transfer control unit 122) resumes the transfer of the phone book data (S42). Thereafter, the processing after S37 described above is performed.

In this way, when the connection using the PBAP is interrupted during the transfer of the phone book data, the control unit 120 displays an error and displays the reconnection screen for receiving an input that gives an instruction to reconnect using the PBAP. Then, when the input that gives the instruction to reconnect using the PBAP is received through the reconnection screen, the control unit 120 performs the reconnection using the PBAP. With this configuration, the user can recognize the interruption of the connection using the PBAP during the transfer of the phone book data, and can select whether or not to perform the reconnection using the PBAP. As a result, the convenience of the user is improved.

Note that, in the present embodiment, a control is performed to display the reconnection screen when the connection using the PBAP is interrupted during the transfer of both the history data and the phone book data, but the present disclosure is not limited thereto. For example, the above-described control may be performed only for any one of the history data and the phone book data.

In S37 described above, in a case where it is determined that the PBAP connection is not interrupted (S37 "No"), the control unit 120 (data transfer control unit 122) determines whether or not the transfer of the phone book data is completed (S44). In a case where it is determined that the transfer of the phone book data is completed (S44 "YES"), the control unit 120 (data transfer control unit 122) disconnects the wireless communication using the PBAP with the mobile phone 2 (S44).

Next, the control unit 120 (data transfer control unit 122) automatically connects the wireless communication using the HFP with the mobile phone 2 again (S45).

Then, once the wireless communication using the HFP with the mobile phone 2 is established, the control unit 120 (hands-free call connection control unit 111) proceeds to hands-free (HF) standby processing (S46). While the hands-free standby processing is performed, the in-vehicle hands-free device 1A is in a state where a call can be made or received via the mobile phone 2. The hands-free standby processing is continued until the power of the in-vehicle hands-free device 1A is cut off or the wireless communication using the HFP with the mobile phone 2 is released. The release of the wireless communication using the HFP with the mobile phone 2 means that a case where the user performs a release operation on the in-vehicle hands-free device 1A or the mobile phone 2, or a case where the mobile phone 2 gets out of the Bluetooth communication range of the in-vehicle hands-free device 1A.

As described above, in the present embodiment, wireless communication is automatically switched serially in the order of HFP→PBAP→HFP. As a result, it is possible to reliably and stably perform communication processing for mobile phones that support wireless communication using the HFP and wireless communication using the PBAP and are manufactured by many manufacturers. Further, with such a method, it is possible to reduce the complexity of software processing in the in-vehicle hands-free device 1A.

Further, in a case where it is determined that the wireless communication connection using the HFP is not successful (has failed) (S23 "No"), the control unit 120 (hands-free call connection control unit 111) determines whether or not a mobile phone 2 having the next highest priority exists (S227).

In a case where it is determined that the mobile phone 2 having the next highest priority exists (S227 "Yes"), the control unit 120 (hands-free call connection control unit 111) selects the mobile phone 2 having the next highest priority as a wireless communication target (S228), returns to S22 described above, and repeats the above-described processing.

Further, in a case where it is determined that the mobile phone 2 having the next highest priority does not exist (S227 "No"), the control unit 120 (hands-free call connection control unit 111) ends the processing of the flowchart.

Note that the processing of transferring the outgoing call history data, the incoming call history data, and the missed call history data described above with reference to FIG. 23 and the like is the same as that of the in-vehicle hands-free device 1 of the first embodiment.

As described above, as a more reliable processing procedure using the HFP and the PBAP, the in-vehicle hands-free device 1A of the present embodiment performs a serial connection, in which the HFP and the PBAP are temporally divided, in order to prevent simultaneous connection of the HFP and the PBAP as much as possible. As a result, it is possible to reliably and stably perform communication processing for mobile phones that support the HFP and the PBAP and are manufactured by many manufacturers. In addition, it is possible to perform the processing for the PBAP and the HFP in a simple manner without complicating the processing in the in-vehicle hands-free device 1A.

Further, when the connection using the PBAP is interrupted during the transfer of the history data or phone book data, the in-vehicle hands-free device 1A of the present embodiment displays an error and displays the reconnection screen for receiving an input that gives an instruction to reconnect using the PBAP. Then, when the input that that gives the instruction to reconnect using the PBAP is received through the reconnection screen, the in-vehicle hands-free device 1A performs the reconnection using the PBAP. With this configuration, the user can recognize the interruption of the connection using the PBAP during the transfer of the history data or phone book data, and can select whether or not to perform the reconnection using the PBAP. As a result, the convenience of the user is improved.

Further, in a case where the security is set in the mobile phone 2 to prohibit or limit the transfer of the history data or phone book data, the in-vehicle hands-free device 1A of the present embodiment displays a message indicating that the transfer of the history data or phone book data is not allowed. This message may include the reason why the transfer is not allowed. By doing so, the user can know the reason why the history data or phone book data cannot be downloaded, which improves the convenience of the user. In addition, the owner of the mobile phone 2 can be relieved because the owner can confirm that the history data or phone book data in the mobile phone 2 is not unintentionally transferred to the in-vehicle hands-free device 1A.

Third Embodiment

Next, a third embodiment will be described. In the present embodiment, a procedure for generating the all history data described above is different from that of the first embodiment described above. More specifically, the present embodiment is different from the first embodiment described above in that, in a case where the mobile phone 2 supports an all history request for collectively transferring the history data, the history data are collectively transferred, and the control unit 120 (data transfer control unit 122) of the present embodiment causes the display unit 15 to display the transferred history data. Here, the all history request is an example of a collective transfer request according to the present disclosure.

More specifically, in a case where the mobile phone 2 does not support the all history request, the control unit 120 (data transfer control unit 122) performs a control to transfer a predetermined numbers of respective pieces of latest incoming call history data, the pieces of latest outgoing call history data, and the pieces of latest missed call history data from the latest to the oldest, and causes the display unit 15 to display, as the history data, all history data (all call history) generated on the basis of date and time information set in each of the incoming call history data, the outgoing call history data, and the missed call history data that are transferred. As described above, the all history data is data in which the outgoing call history data, the incoming call history data, and the missed call history data are collectively displayed from the latest to the oldest.

Further, in a case where the mobile phone 2 does not support the all history request, and the date and time information is not set in at least one of the incoming call history data, the outgoing call history data, and the missed call history data included in the history data, the control unit 120 (data transfer control unit 122) performs a control to transfer a predetermined numbers of respective pieces of incoming call history data, the pieces of outgoing call history data, and the pieces of missed call history data, and causes the display unit 15 to display, as the history data, all history data generated on the basis of the order of reception of each of the incoming call history data, the outgoing call history data, and the missed call history data that are transferred. In this case, the all history data is data in which the outgoing call history data, the incoming call history data, and the missed call history data are collectively displayed according to the order of reception.

Figure 24:
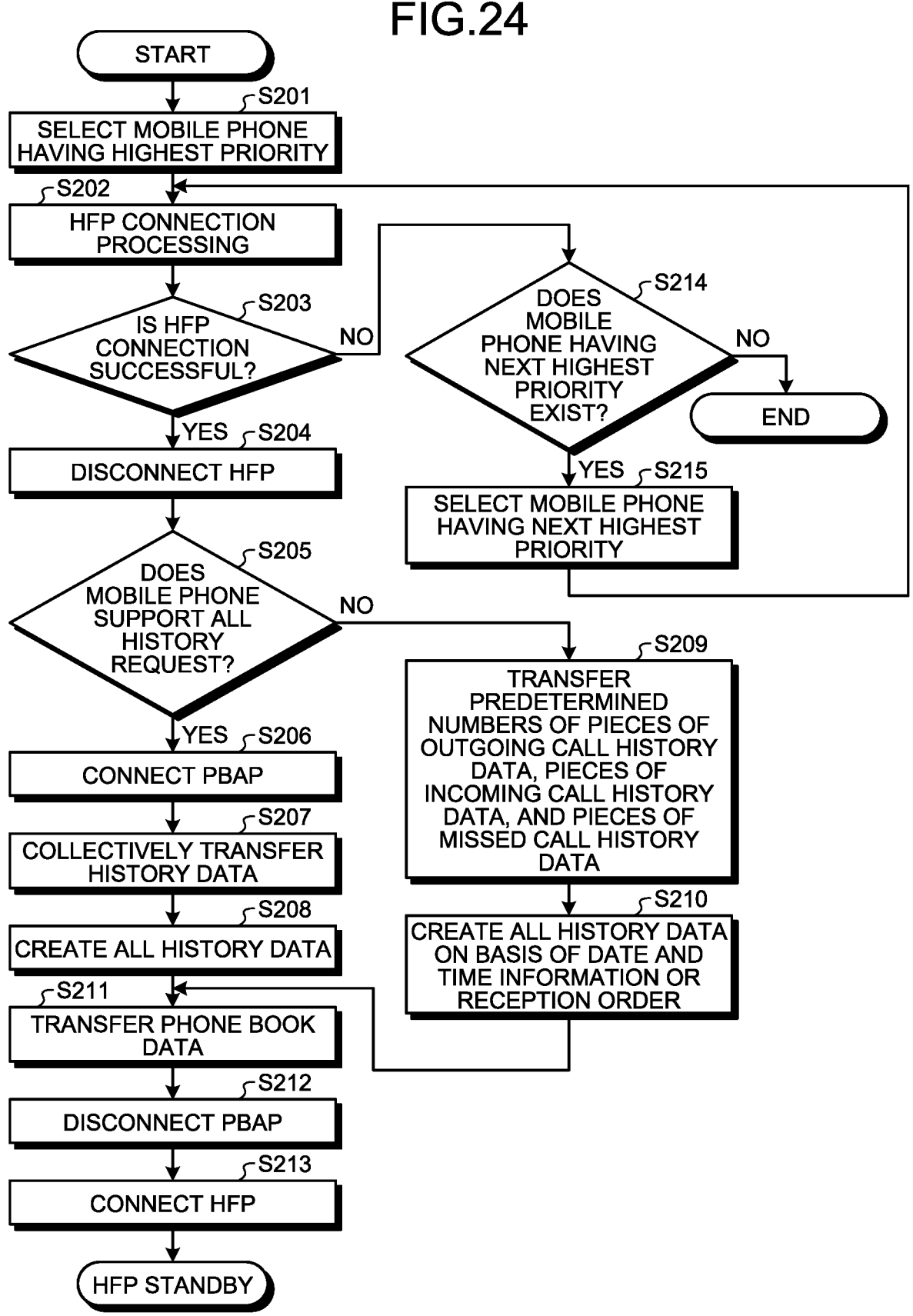
FIG. 24 is a diagram illustrating an example of a flow of data transfer processing according to a second embodiment.

FIG. 24 is a diagram illustrating an example of a procedure in which the control device 12 receives the history data including the outgoing call history data, the incoming call history data, the missed call history data, and the phone book data from the mobile phone 2 in the in-vehicle hands-free device 1A of the present embodiment. Hereinafter, differences from the first embodiment described above will be mainly described with reference to FIG. 24. A description of a portion overlapping with the first embodiment described above will be omitted as appropriate.

Figure 23:
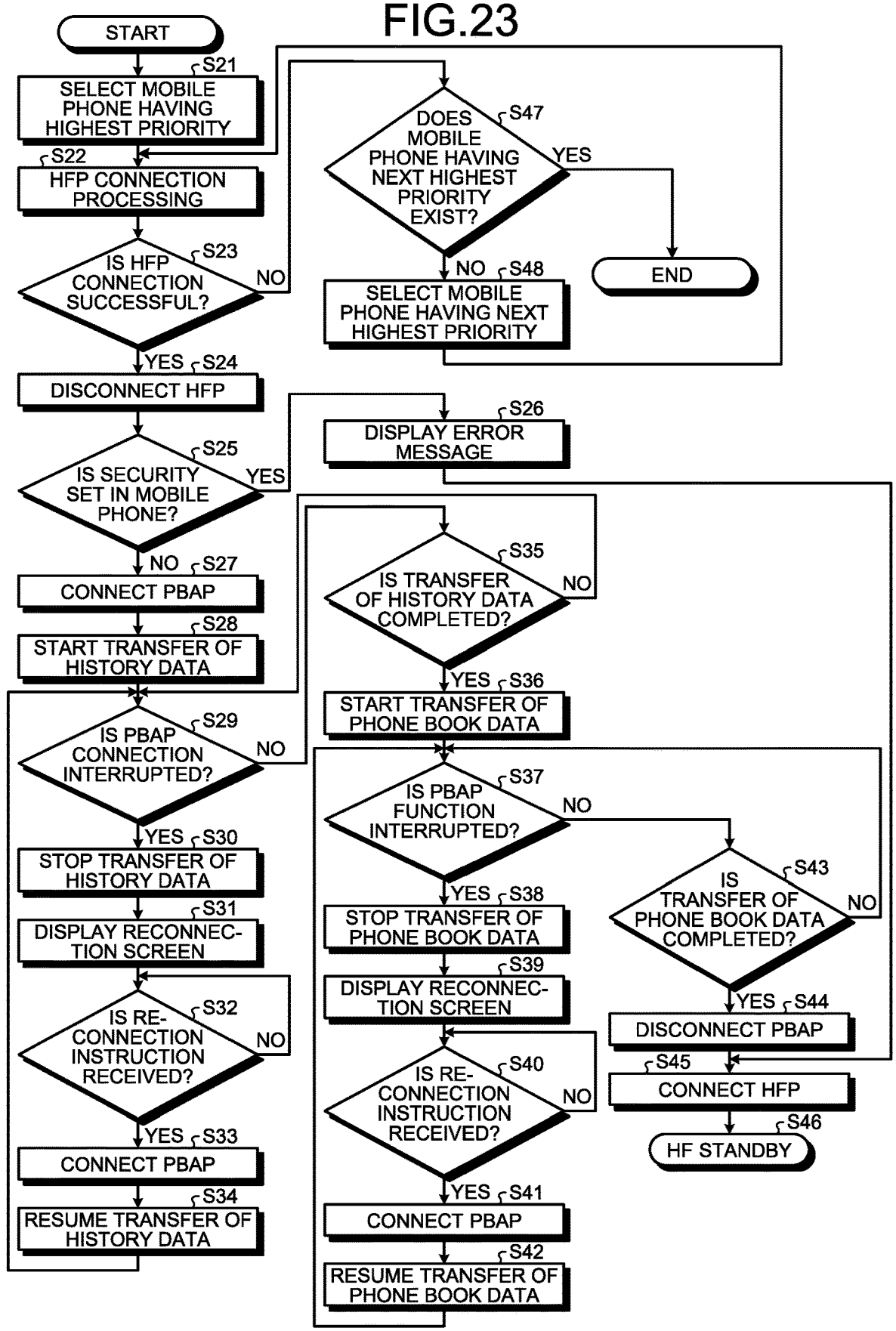
FIG. 23 is a diagram illustrating an example of a flow of data transfer processing according to the first embodiment.

Since the processing in S401 to S404 in FIG. 24 is the same as the processing in S21 to S24 in FIG. 23, a description thereof will be omitted. In S405, the control unit 120 (data transfer control unit 122) determines whether or not the mobile phone 2 supports the all history request.

In a case where the determination result in S405 indicates that the mobile phone 2 supports the all history request (S405, "YES"), the control unit 120 (data transfer control unit 122) automatically connects the wireless communication using the PBAP with the mobile phone 2 with which the wireless communication connection using the HFP is successful (S406).

Next, the control unit 120 (data transfer control unit 122) transmits the full history request to the mobile phone 2 for the collective transfer of the history data (S407).

The mobile phone 2 receiving the all history request collectively transfers the history data to the in-vehicle hands-free device 1A through Bluetooth communication using the PBAP. The control unit 120 (data transfer control unit 122) stores the history data transferred from the mobile phone 2 in the working memory 16 or the storage memory 17. Then, the control unit 120 (data transfer control unit 122) generates the all history data (S408). Here, in a case where the date and time information is set in each of the incoming call history data, the outgoing call history data, and the missed call history data included in the history data transferred from the mobile phone 2, the control unit 120 (data transfer control unit 122) generates the all history data in which the outgoing call history data, the incoming call history data, and the missed call history data are collectively displayed from the latest to the oldest on the basis of the date and time information. On the other hand, in a case where the date and time information is not set in each of the incoming call history data, the outgoing call history data, and the missed call history data included in the history data transferred from the mobile phone 2, the control unit 120 (data transfer control unit 122) generates the all history data on the basis of the order of reception of each of the incoming call history data, the outgoing call history data, and the missed call history data. In this case, the all history data is data in which the outgoing call history data, the incoming call history data, and the missed call history data are collectively displayed according to the order of reception. Note that a timing to generate the all history data is arbitrary, and can be arbitrarily changed according to design conditions and the like. For example, the all history data may also be generated after the transfer of the phone book data is completed.

On the other hand, in a case where the determination result in S405 indicates that the mobile phone 2 does not support the all history request (S405, "No"), the control unit 120 (data transfer control unit 122) transmits, to the mobile phone 2, a history data transfer request to cause the mobile phone 2 to transfer a predetermined numbers of pieces of outgoing call history data, pieces of incoming call history data, and pieces of missed call history data (S409). The mobile phone 2 receiving the history data transfer request transfers a predetermined numbers of respective pieces of outgoing call history data, the pieces of incoming call history data, and the pieces of missed call history data to the in-vehicle hands-free device 1A through Bluetooth communication using the PBAP. The control unit 120 (data transfer control unit 122) stores the history data transferred from the mobile phone 2 in the working memory 16 or the storage memory 17. Then, the control unit 120 (data transfer control unit 122) generates the all history data on the basis of the date and time information set in the history data or the order of reception of the history data (S410). More specifically, in a case where the date and time information is set in each of the outgoing call history data, the incoming call history data, and the missed call history data included in the history data transferred from the mobile phone, the control unit 120 (data transfer control unit 122) generates the all history data on the basis of those date and time information. The all history data is data in which the outgoing call history data, the incoming call history data, and the missed call history data are collectively displayed from the latest to the oldest. On the other hand, in a case where the date and time information is not set in each of the incoming call history data, the outgoing call history data, and the missed call history data included in the history data transferred from the mobile phone 2, the control unit 120 (data transfer control unit 122) generates the all history data on the basis of the order of reception of each of the incoming call history data, the outgoing call history data, and the missed call history data.

That is, according to the present embodiment, the all history data can be generated even in a case where the mobile phone does not support the all history request. In addition, even in a case where the date and time information is not set in the history data transferred from the mobile phone 2, it is possible to generate the all history data on the basis of the order of reception of each of the incoming call history data, the outgoing call history data, and the missed call history data included in the history data. As a result, the convenience of the user who uses the in-vehicle hands-free device 1A can be improved.

Next, once the processing of transferring the history data is completed, the control unit 120 (data transfer control unit 122) transmits a phone book data transfer request to the mobile phone 2 to start the processing of transferring the phone book data (S411).

The mobile phone 2 receiving the phone book data transfer request transfers the phone book data to the in-vehicle hands-free device 1A through Bluetooth communication using the PBAP. The control unit 120 (data transfer control unit 122) stores the phone book data transferred from the mobile phone 2 in the working memory 16 or the storage memory 17.

Once the transfer of the phone book data is completed, the control unit 120 (data transfer control unit 122) disconnects the wireless communication using the PBAP with the mobile phone 2 (S412).

Next, the control unit 120 (hands-free call connection control unit 111) automatically connects the wireless communication using the HFP with the mobile phone 2 again (S413). Then, once the wireless communication using the HFP with the mobile phone 2 is established, the control unit 120 (hands-free call connection control unit 111) proceeds to hands-free (HF) standby processing (S414).

Note that the configuration of the first embodiment described above and the configuration of the present embodiment can be arbitrarily combined. For example, the control unit 120 according to the present embodiment may be configured to control the display of the reconnection screen on the display unit 15 as in the first embodiment described above.

Other Embodiments

The present disclosure is not limited to each of the above-described embodiments, and can be modified or extended as follows.

Figure 25A:
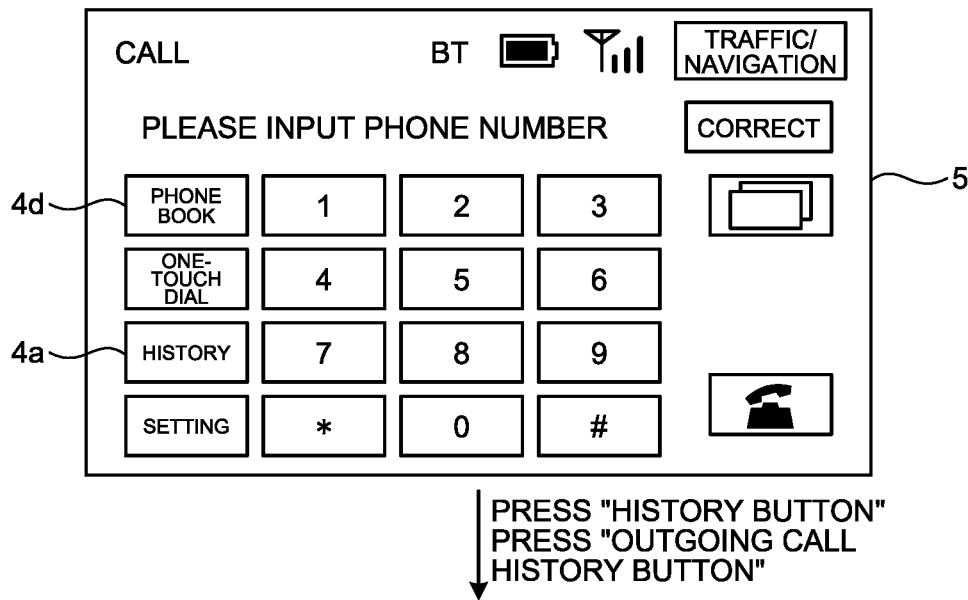
FIG. 25A is a diagram illustrating an example of screen transition in a case where an outgoing call operation screen through which an outgoing call operation using an outgoing call history of an emergency call can be performed is displayed according to another embodiment.
Figure 25B:
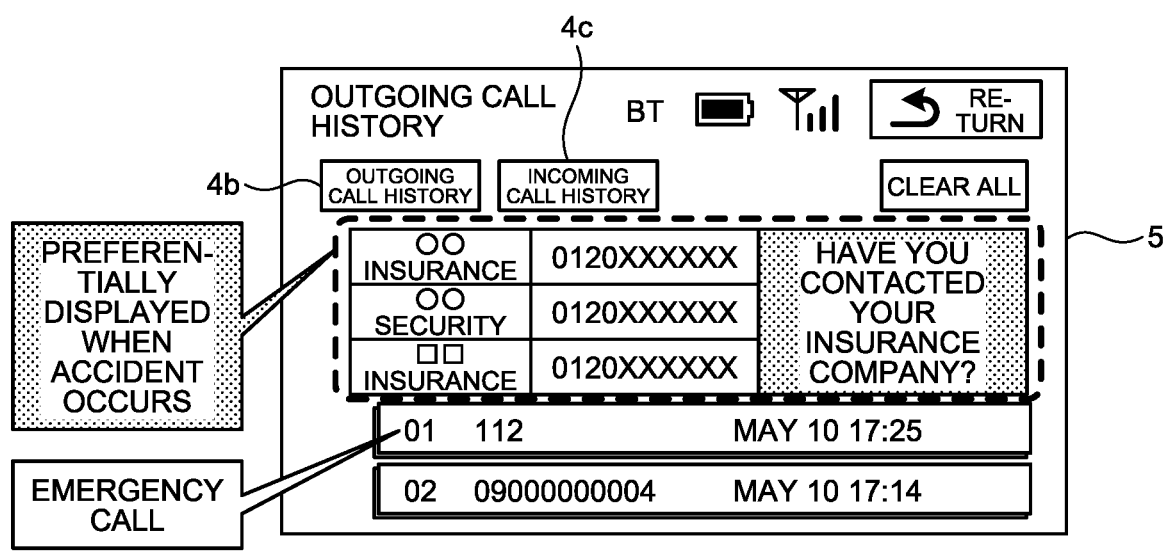
FIG. 25B is a diagram illustrating the example of the screen transition in the case where the outgoing call operation screen through which the outgoing call operation using the outgoing call history of the emergency call can be performed is displayed according to another embodiment.

For example, a pre-registered phone number or registration name may be displayed as a contact destination to which the outgoing call operation can be performed, on the outgoing call operation screen through which the outgoing call operation using the emergency call history described above can be performed. For example, after the transfer of the emergency history data described above is completed, when a "history" button is pressed on a screen of FIG. 25A, the control unit 102 (display control unit 114) performs a control to display an outgoing call operation screen illustrated in FIG. 25B on the display unit 15. In the example of FIG. 25B, the pre-registered phone number or registration name is displayed above the emergency call history, but the present disclosure is not limited thereto, and a mode in which the pre-registered phone number or registration name is displayed is arbitrary. For example, the pre-registered phone number or registration name may be displayed below the emergency call history.

Further, in the example of FIG. 25B, a contact destination of an insurance company is pre-registered as an emergency contact destination, but the present disclosure is not limited thereto. The pre-registered phone number or registration name is arbitrary, and for example, a contact destination such as a contact destination of a family, a workplace, a school, a car maker, a police station, a fire department, or the like may be pre-registered.

With the above-described configuration, the phone number or registration name pre-registered as the emergency contact destination is displayed together with the emergency call history, which is advantageous in that the emergency call operation can be easily performed.

Each of the in-vehicle hands-free device 1 and the in-vehicle hands-free device 1A may be implemented by a dedicated hands-free device that mainly implements the hands-free function, or may be a vehicle audio device having the hands-free function, which plays a CD and radio. Further, each of the in-vehicle hands-free device 1 and the in-vehicle hands-free device 1A may be portable.

In addition to the Bluetooth communication between the mobile phone 2 and the in-vehicle hands-free device 1 or the in-vehicle hands-free device 1A, other short-range wireless communication or wired communication may be performed.

The outgoing call history data, the incoming call history data, and the phone book data received from the mobile phone 2 may be stored in the storage memory 17, and the outgoing call history data, the incoming call history data, and the phone book data may be updated each time the outgoing call history data, the incoming call history data, and the phone book data are received from the mobile phone 2. Further, the outgoing call history data, the incoming call history data, and the phone book data received from the mobile phone 2 may be stored in both the working memory 16 and the storage memory 17, and the storage memory 17 may be used as a backup memory.

The numbers of pieces of outgoing call history data and pieces of incoming call history data that can be stored in the working memory 16 may be one. In this case, when the in-vehicle hands-free device 1 performs the outgoing call processing and the incoming call processing, the outgoing call history data and the incoming call history data received through the wireless communication connection using the PBAP are always erased.

Further, although a case where a plurality of outgoing call history data and a plurality of incoming call histories are displayed at the same time in the in-vehicle hands-free device 1 or the in-vehicle hands-free device 1A has been described above, the outgoing call history data and the incoming call history may be displayed one by one. In this case, for example, the latest data may be displayed first, and then the second latest data may be displayed in order by the operation in the operation unit 14.

The numbers of pieces of outgoing call history data and pieces of incoming call history data that can be stored in the working memory 16 may be one. In this case, when the in-vehicle hands-free device 1 performs the outgoing call processing and the incoming call processing, the outgoing call history data and the incoming call history data received through the wireless communication connection using the PBAP are always erased.

In addition to a configuration in which the outgoing call history data or incoming call history data is automatically transferred when the mobile phone 2 and the in-vehicle hands-free device 1 establish a Bluetooth communication link, a configuration in which the outgoing call history data, incoming call history data, or phone book data is transferred when the user operates the in-vehicle hands-free device 1 and the mobile phone 2 may be possible.

In addition to a configuration in which when the outgoing call history data, the incoming call history data, and the phone book data received from the mobile phone 2 for each mobile phone 2 are stored in the working memory 16, the mobile phone 2 and the data stored in the working memory 16 are associated with each other by generating the link key, a configuration in which the mobile phone 2 and the data stored in the working memory 16 are associated with each other by using another method may be possible.

According to the present disclosure, it is possible to improve the convenience in using the hands-free device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A hands-free device enabling a hands-free call by being wirelessly connected to a mobile phone that stores incoming call history data indicating an incoming call phone number as an incoming call source from which an incoming call has been received, outgoing call history data indicating an outgoing call phone number as an outgoing call destination to which an outgoing call has been made, and phone book data in which a phone number and a registration name corresponding to the phone number are registered, the hands-free device comprising:
   a memory; and
   a hardware processor coupled to the memory, the memory storing a program that, when executed by the hardware processor, causes the hands-free device to:
      perform control related to data transfer using a transfer protocol for implementing transfer of history data including the incoming call history data and the outgoing call history data, and the phone book data stored in the mobile phone when the mobile phone is in a wireless connection area;
      receive the history data and the phone book data from the mobile phone through communication using the transfer protocol;
      store the history data and the phone book data that are received;
      perform the control to transfer the history data prior to the phone book data;
      connect a hands-free call protocol for implementing a hands-free call by the mobile phone, between the hands-free device and the mobile phone;
      make an outgoing call to a destination of an emergency call via the mobile phone when a condition for making the emergency call is satisfied; and
      in a case where the hardware processor is in a connection state of the hands-free call protocol and a call receiving state, receive the outgoing call history data from the mobile phone by using the transfer protocol when the call receiving state is terminated, and transition to a communication state different from the call receiving state occurs.

2. The hands-free device according to claim 1, wherein the outgoing call history data received from the mobile phone includes a phone number of the destination of the emergency call or identification information of the destination.

3. The hands-free device according to claim 2, wherein the program, when executed by the hardware processor, causes the hands-free device to, after the outgoing call history data is received from the mobile phone, cause a display to display an outgoing call operation screen through which an outgoing call operation using an outgoing call history is performable according to an operation performed by a user.

4. The hands-free device according to claim 3, wherein on the outgoing call operation screen, a pre-registered phone number or registration name is displayed as a contact destination to which the outgoing call operation is performable.

5. The hands-free device according to claim 1, wherein
   the transfer protocol is a phone book access profile (PBAP), and
   the program, when executed by the hardware processor, causes the hands-free device to:
      when connection using the PBAP is interrupted during transfer of the history data or phone book data, display an error and cause a display to display a reconnection screen for receiving an input that gives an instruction to reconnect using the PBAP, and
      when the input that gives the instruction to reconnect using the PBAP is received through the reconnection screen, reconnect using the PBAP.

6. The hands-free device according to claim 5, wherein the program, when executed by the hardware processor, causes the hands-free device to, in a case where the mobile phone supports a collective transfer request for collectively transferring the history data, perform the control to collectively transfer the history data and cause the display to display the transferred history data.

7. The hands-free device according to claim 6, wherein
   the program, when executed by the hardware processor, causes the hands-free device to, in a case where the mobile phone does not support the collective transfer request,
      perform the control to transfer predetermined numbers of pieces of latest incoming call history data, pieces of latest outgoing call history data, and pieces of latest missed call history data from the latest to the oldest, and
      cause the display to display, as the history data, all call history generated based on date and time information set in each piece of the incoming call history data, the outgoing call history data, and the missed call history data that are transferred.

8. The hands-free device according to claim 6, wherein
   the program, when executed by the hardware processor, causes the hands-free device to, in a case where the mobile phone does not support the collective transfer request, and the date and time information is not set in at least one of the incoming call history data, the outgoing call history data, and the missed call history data included in the history data,
      perform the control to transfer a predetermined numbers of respective pieces of incoming call history data, the pieces of outgoing call history data, and the pieces of missed call history data, and
      cause the display to display, as the history data, all call history generated based on an order of reception of each of the incoming call history data, the outgoing call history data, and the missed call history data that are transferred.

9. The hands-free device according to claim 1, wherein the program, when executed by the hardware processor, causes the hands-free device to, in a case where the mobile phone is set to prohibit or limit transfer of the history data or the phone book data, cause a display to display information indicating that transfer of the history data or the phone book data is not allowed.

10. The hands-free device according to claim 1, wherein
    the program, when executed by the hardware processor, causes the hands-free device to, when causing a display to display the history data,
       compare outgoing call date and time included in the outgoing call history data with incoming call date and time included in the incoming call history data, and cause the display to display data having later date and time as latest data, and
       in a case where the outgoing call date and time and the incoming call date and time are the same as each other, cause the display to display the outgoing call history data as later data than the incoming call history data, or cause the display to display the incoming call history data as later data than the outgoing call history data.

11. A hands-free system enabling a hands-free call by being wirelessly connected to a mobile phone that stores incoming call history data indicating an incoming call phone number as an incoming call source from which an incoming call has been received, outgoing call history data indicating an outgoing call phone number as an outgoing call destination to which an outgoing call has been made, and phone book data in which a phone number and a registration name corresponding to the phone number are registered, the hands-free system comprising:
  a memory; and
  a hardware processor coupled to the memory, the memory storing a program that, when executed by the hardware processor, causes the hands-free system to:
    perform control related to data transfer using a transfer protocol for implementing transfer of the incoming call history data, the outgoing call history data, and the phone book data stored in the mobile phone, when the mobile phone is in a wireless connection area;
    receive the outgoing call history data, the incoming call history data, and the phone book data from the mobile phone through communication using the transfer protocol;
    store the outgoing call history data, the incoming call history data, and the phone book data that are received;
    perform the control to transfer history data including the outgoing call history data and the incoming call history data prior to the phone book data;
    connect a hands-free call protocol for implementing a hands-free call by the mobile phone, between the hands-free system and the mobile phone;
    make an outgoing call to a destination of an emergency call via the mobile phone when a condition for making the emergency call is satisfied; and
    in a case where the hardware processor is in a connection state of the hands-free call protocol and a call receiving state, receive the outgoing call history data from the mobile phone by using the transfer protocol when the call receiving state is terminated, and transition to a communication state different from the call receiving state occurs.

12. A data transfer method performed by a hands-free device enabling a hands-free call by being wirelessly connected to a mobile phone that stores incoming call history data indicating an incoming call phone number as an incoming call source from which an incoming call has been received, outgoing call history data indicating an outgoing call phone number as an outgoing call destination to which an outgoing call has been made, and phone book data in which a phone number and a registration name corresponding to the phone number are registered, the data transfer method comprising:
  performing control related to data transfer using a transfer protocol for implementing transfer of the incoming call history data, the outgoing call history data, and the phone book data stored in the mobile phone, when the mobile phone is in a wireless connection area;
  receiving the outgoing call history data, the incoming call history data, and the phone book data from the mobile phone through communication using the transfer protocol;
  storing, in a data storage, the outgoing call history data, the incoming call history data, and the phone book data that are received;
  in the performing the control, history data including the outgoing call history data and the incoming call history data is transferred prior to the phone book data is transferred;
  connecting a hands-free call protocol for implementing a hands-free call by the mobile phone, between the hands-free device and the mobile phone;
  making an outgoing call to a destination of an emergency call via the mobile phone when a condition for making the emergency call is satisfied; and
  in a case where the hardware processor is in a connection state of the hands-free call protocol and a call receiving state, receiving the outgoing call history data from the mobile phone by using the transfer protocol when the call receiving state is terminated, and transition to a communication state different from the call receiving state occurs.

* * * * *